US012443699B2

(12) United States Patent
Mehta et al.

(10) Patent No.: US 12,443,699 B2
(45) Date of Patent: *Oct. 14, 2025

(54) UNLOCK AND RECOVERY FOR ENCRYPTED DEVICES

(71) Applicant: Microsoft Technology Licensing, LLC, Redmond, WA (US)

(72) Inventors: Yogesh A. Mehta, Redmond, WA (US); Octavian T. Ureche, Bellevue, WA (US); Scott R. Shell, Kirkland, WA (US); Innokentiy Basmov, Redmond, WA (US); Peter Novotney, Seattle, WA (US); Christopher L. Walstad, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 560 days.

This patent is subject to a terminal disclaimer.

(21) Appl. No.: 17/697,435

(22) Filed: Mar. 17, 2022

(65) Prior Publication Data

US 2022/0207130 A1  Jun. 30, 2022

Related U.S. Application Data

(60) Division of application No. 16/778,968, filed on Jan. 31, 2020, now Pat. No. 11,295,004, which is a (Continued)

(51) Int. Cl.
*G06F 21/45* (2013.01)
*G06F 21/62* (2013.01)
(Continued)

(52) U.S. Cl.
CPC .......... *G06F 21/45* (2013.01); *G06F 21/6218* (2013.01); *H04L 9/0897* (2013.01); (Continued)

(58) Field of Classification Search
CPC ................. G06F 21/45; G06F 21/6218; G06F 2221/2131; H04L 9/0897; H04L 9/3226; H04L 9/3234
See application file for complete search history.

(56) References Cited

U.S. PATENT DOCUMENTS 8,447,990 B2 * 5/2013 Utin ..................... G06F 21/6245
705/72
8,700,899 B1 * 4/2014 Juels ................... H04W 12/043
380/47

(Continued)

FOREIGN PATENT DOCUMENTS

CN 102739708 A 10/2012
CN 103038776 A 4/2013
(Continued)

OTHER PUBLICATIONS

"Second Office Action Issued in Chinese Patent Application No. 201680066320.4", Mailed Date: Apr. 6, 2022, 9 Pages.
(Continued)

*Primary Examiner* — Sher A Khan
(74) *Attorney, Agent, or Firm* — ArentFox Schiff LLP

(57) ABSTRACT

A computing device can perform operations to unlock encrypted volumes of the computing device while the computing device is in a recovery environment. In some examples, the computing device can work in conjunction with a test computing device to unlock the encrypted volumes using an unlock token and a PIN. In other examples, the computing device can perform operations without a test computing device. For example, the computing device can, while in the recovery environment, use credentials associated with a user of the computing device to obtain a recovery password to unlock keys for interpreting the encrypted volumes. In some examples, the computing device can use a shortened recovery password in conjunction with anti-
(Continued)

hammering capabilities of a Trusted Platform Module in order to unlock keys for interpreting the encrypted volumes. These and other operations can facilitate secure unlock of volumes of encrypted data on a consumer device.

17 Claims, 10 Drawing Sheets

Related U.S. Application Data division of application No. 16/107,234, filed on Aug. 21, 2018, now Pat. No. 10,713,350, which is a continuation of application No. 14/941,246, filed on Nov. 13, 2015, now Pat. No. 10,078,748.

(51) Int. Cl.
 *H04L 9/08* (2006.01)
 *H04L 9/32* (2006.01)
(52) U.S. Cl.
 CPC .......... *H04L 9/3226* (2013.01); *H04L 9/3234* (2013.01); *G06F 2221/2131* (2013.01)

(56) References Cited

U.S. PATENT DOCUMENTS

| | | | | |
|---|---|---|---|---|
| 9,230,109 | B2* | 1/2016 | Wooten | H04L 9/0836 |
| 10,078,748 | B2* | 9/2018 | Mehta | G06F 21/45 |
| 10,395,068 | B2* | 8/2019 | Belk | H04W 12/12 |
| 2004/0123122 | A1* | 6/2004 | Asai | G06F 21/6218 |
| | | | | 713/189 |
| 2006/0041932 | A1* | 2/2006 | Cromer | H04L 9/0897 |
| | | | | 726/6 |
| 2006/0085847 | A1* | 4/2006 | Ikeuchi | G06F 21/35 |
| | | | | 726/6 |
| 2006/0161790 | A1* | 7/2006 | Hunter | G06F 21/575 |
| | | | | 713/189 |
| 2007/0055982 | A1 | 3/2007 | Spilo | |
| 2007/0157032 | A1* | 7/2007 | Paganetti | G06F 21/31 |
| | | | | 713/193 |
| 2007/0226787 | A1* | 9/2007 | Maletsky | G06F 21/71 |
| | | | | 726/9 |
| 2007/0282757 | A1* | 12/2007 | Pandya | G06Q 20/4012 |
| | | | | 705/76 |
| 2008/0141040 | A1* | 6/2008 | Biddle | H04L 9/0897 |
| | | | | 713/193 |
| 2010/0241836 | A1* | 9/2010 | Proudler | H04L 63/20 |
| | | | | 713/1 |
| 2011/0047129 | A1* | 2/2011 | Wang | G06F 11/1469 |
| | | | | 711/E12.001 |
| 2011/0072520 | A1* | 3/2011 | Bhansali | G06F 21/602 |
| | | | | 726/26 |
| 2012/0151199 | A1* | 6/2012 | Shriver | G06F 21/575 |
| | | | | 713/193 |
| 2012/0179915 | A1* | 7/2012 | Horn | G06F 21/80 |
| | | | | 726/19 |
| 2013/0013928 | A1* | 1/2013 | Thom | G06F 21/30 |
| | | | | 713/182 |
| 2013/0145174 | A1* | 6/2013 | Hallum | G06Q 10/10 |
| | | | | 713/189 |
| 2013/0148810 | A1* | 6/2013 | Goel | H04L 9/0891 |
| | | | | 380/278 |
| 2013/0212367 | A1* | 8/2013 | Ingalls | G06F 21/88 |
| | | | | 726/1 |
| 2014/0040622 | A1* | 2/2014 | Kendall | H04W 12/041 |
| | | | | 713/171 |
| 2014/0108786 | A1* | 4/2014 | Kreft | G06Q 20/3825 |
| | | | | 713/194 |
| 2014/0282969 | A1* | 9/2014 | Ye | G06F 21/45 |
| | | | | 726/7 |
| 2014/0310501 | A1* | 10/2014 | Jin | G06F 12/10 |
| | | | | 711/206 |
| 2014/0310509 | A1* | 10/2014 | Potlapally | G06F 11/1417 |
| | | | | 713/2 |
| 2014/0310510 | A1* | 10/2014 | Potlapally | G06F 9/4406 |
| | | | | 714/19 |
| 2015/0121497 | A1* | 4/2015 | Brossard | H04L 63/0869 |
| | | | | 726/7 |
| 2015/0215128 | A1* | 7/2015 | Pal | H04L 63/0815 |
| | | | | 713/155 |
| 2016/0117499 | A1* | 4/2016 | Roy | G06F 21/31 |
| | | | | 726/6 |
| 2016/0140335 | A1* | 5/2016 | Proulx | H04L 9/0863 |
| | | | | 726/6 |
| 2016/0210457 | A1* | 7/2016 | Cleeton | G06F 21/575 |
| 2017/0163471 | A1* | 6/2017 | Zheng | G06Q 50/01 |

FOREIGN PATENT DOCUMENTS

| | | | | |
|---|---|---|---|---|
| CN | 103797491 | A * | 5/2014 | ............ G06F 1/26 |
| CN | 103916471 | A | 7/2014 | |
| CN | 104243213 | A | 12/2014 | |
| CN | 206226481 | U * | 6/2017 | |
| CN | 116541811 | A * | 8/2023 | |
| EP | 1929779 | A2 | 6/2008 | |
| JP | 2005079996 | A * | 3/2005 | |
| KR | 101276217 | B1 | 7/2013 | |
| WO | WO-2014172205 | A1 * | 10/2014 | ........... G06F 21/575 |
| WO | WO-2015136940 | A1 * | 9/2015 | ............. G06F 21/45 |
| WO | WO-2018074453 | A1 * | 4/2018 | ............... E05B 1/00 |

OTHER PUBLICATIONS

"Third Office Action and Search Report Issued in Chinese Patent Application No. 201680066320.4", Mailed Date: Aug. 8, 2022, 44 Pages.

"Office Action Issued in Chinese Patent Application No. 201680066320. 4", Mailed Date: Nov. 30, 2022, 43 Pages.

* cited by examiner

UNLOCK AND RECOVERY FOR ENCRYPTED DEVICES

CROSS REFERENCE TO RELATED APPLICATIONS

The current application is a divisional application of U.S. patent application Ser. No. 16/778,968 filed on Jan. 31, 2020, titled "Unlock and Recovery for Encrypted Devices," which is a divisional application of U.S. patent application Ser. No. 16/107,234 filed on Aug. 21, 2018, titled "Unlock and Recovery for Encrypted Devices," which claims priority to commonly assigned U.S. patent application Ser. No. 14/941,246 filed on Nov. 13, 2015, entitled "Unlock and Recovery for Encrypted Devices," the content of which is incorporated by reference in its entirety.

BACKGROUND

Users of computing devices are increasingly encrypting the data stored in their computing devices using various encryption mechanisms in order to protect stored information. While the process of encrypting data is relatively simple using the various encryption mechanisms, users, software providers, and original equipment manufacturers (OEMs) sometimes have to deal with a computing device entering a recovery environment. Unlocking encrypted data in the computing device while in the recovery environment is often difficult and sometimes not possible using current techniques.

SUMMARY

The techniques discussed herein facilitate unlocking and recovery of encrypted data on computing devices in a secure manner. In some examples, the techniques described herein can be performed while a computing device has booted up in a recovery environment, or recovery mode. For example, the normal boot sequence of the computing device can have been corrupted or compromised in some way that forces boot of the computing device into recovery mode rather than the normal boot sequence. While in recovery mode, a computing device, such as a retail device or a user device, can need to have various tests and/or debugging performed on it by an OEM or a software provider. However, a user of the computing device can have used various encryption mechanisms (e.g., BitLocker®, FileVault®, etc.) to encrypt one or more data partitions of the computing device. The techniques described in this application facilitate unlocking and recovery of encrypted data on a computing device in a secure manner.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items. Moreover, the figures are intended to illustrate general concepts, and not to indicate required and/or necessary elements.

DETAILED DESCRIPTION

Overview

Figure 1:
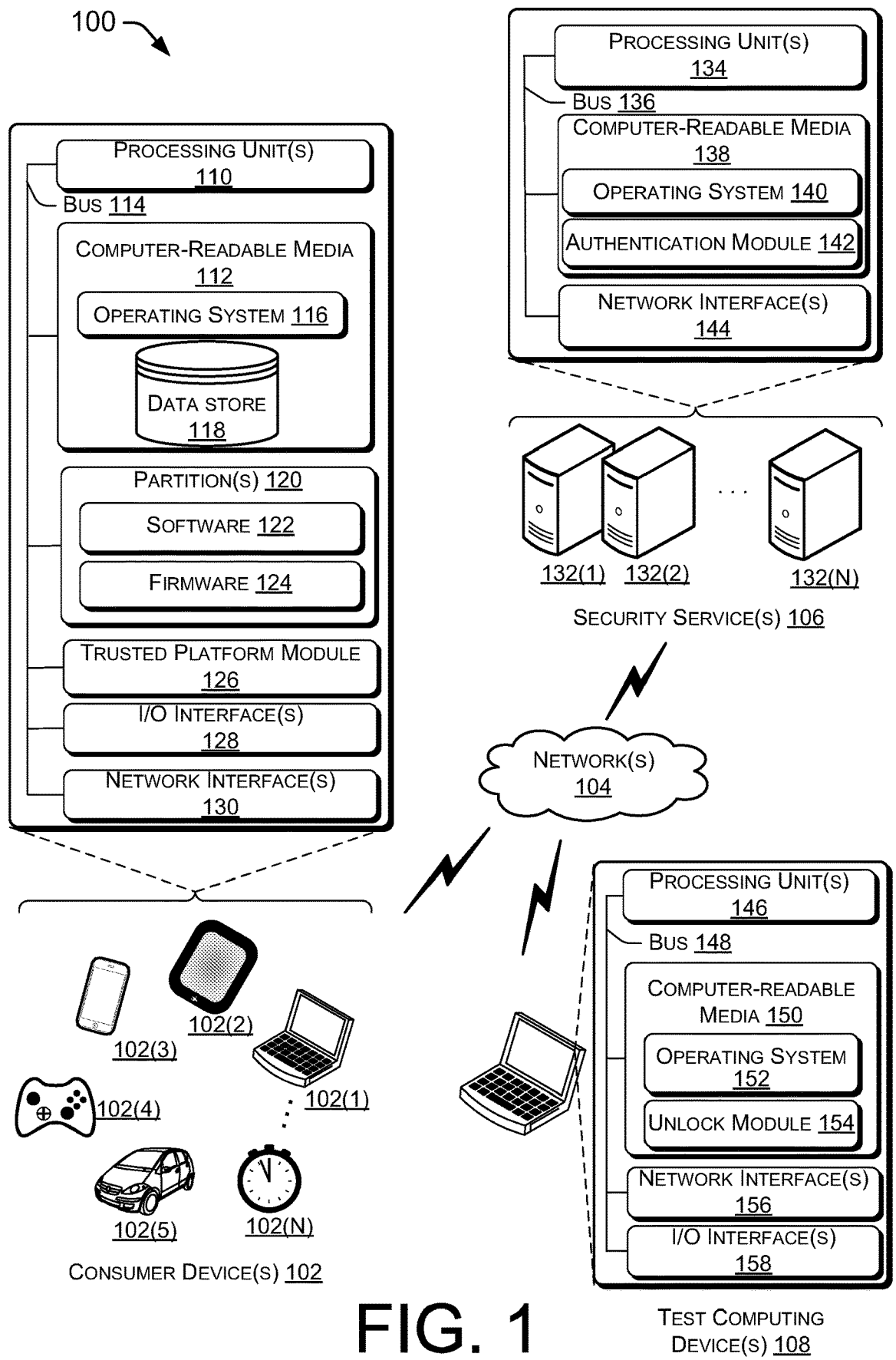
FIG. 1 is a block diagram depicting an example environment for unlocking encrypted data stored on a consumer device.

Techniques described herein facilitate unlocking and recovery of encrypted data on computing devices in a secure manner. More specifically, the techniques facilitate unlocking and recovery of encrypted data while a computing device is in a recovery mode. Generally, recovery mode is a mode in which a computing device can boot into with which various recovery and diagnostic tools can be used to resolve problems with the computing device. For example, the normal system boot sequence of a computing device can have been corrupted or compromised which forces boot of the computing device into recovery mode rather than the normal boot sequence.

In at least one example, the techniques can enable testing and/or debugging of a computing device, such as a retail or enterprise device (i.e., devices deployed in a business environment) or a consumer device (i.e., a device used by the general public, including casual use outside of a business environment), while the device is in a recovery environment. The computing device can have one or more data partitions, such as a data partition containing an Operating System, encrypted using various encryption mechanisms (e.g., BitLocker®, FileVault®, etc.). Techniques describe herein can unlock the encrypted partitions while the computing device is in recovery mode.

In some examples, an unlock module can be stored and executed on the computing device itself, a test computing device disparate from the computing device, or partly on both devices, to facilitate unlocking of encrypted data partitions. As part of the unlocking process, the unlock module can obtain information associated with the computing device, such as the computing device identification number and/or OEM information associated with the computing device. Using this information, the unlock module can provide the information to an authorization service (e.g., Microsoft®, Google®, Apple®, etc.), which can verify that the information is associated with the computing device. The authorization service can use the verified information to provide the unlock module with a signed unlock token. Further, the unlock module can require a personal identification number (PIN). The PIN can be the same as, or different than, the PIN used to unlock the computing device in normal system boot operation. If the PIN is a valid PIN as determined by the computing device, the unlock module can interact with a Trusted Platform Module (TPM) of the computing device in order to unlock encryption keys used for encrypting and decrypting data stored on the consumer computing device upon the next boot. By using a pin, this unlock module can ensure that only a user (e.g., owner, authorized user, etc.) of the computing device can authorize the unlock module to unlock the computing device. The unlock module can provide a way to unlock a computing device in recovery mode, while still ensuring that the unlock procedure is authorized of the computing device by requiring the pin.

In some examples, encrypted information may need to be recovered from a computing device when the computing device goes into a recovery mode. A recovery password can be used while in the recovery mode in order to unlock the computing device. To achieve a threshold amount of security needed to protect the encrypted data, lengthy passwords (e.g., 48 characters, 64, 72 characters, etc.) can be used to obtain the required amount of entropy for maintaining security during a sustained attack on the encrypted data. Rather than a user having to remember a lengthy recovery password, which may be typed incorrectly or easily forgotten, techniques described herein combine anti-hammering capabilities of the computing device's Trusted Platform Module (TPM) with a shorter recovery password. By utilizing the anti-hammering capabilities of the TPM, a shorter password (e.g., 3, 4, or 5 characters) can be utilized to unlock the computing device while maintaining the same measure of entropy, or security, associated with the lengthy recovery password (e.g., 48 characters, 64 characters, 72 characters, etc.). Generally, anti-hammering relates to techniques of preventing brute force attacks on password entry requirements by locking out an entity who has entered an incorrect password beyond a certain threshold of allowable attempts.

In some examples, a computing device that is in recovery mode can use credentials associated with an account, such as a security account, in order to retrieve a recovery password, rather than having to receive a lengthy recovery password. For example, a user can have one or more security accounts (e.g., Azure Active Directory (AAD), Microsoft Account (MSA), etc.) associated with a user profile or with a particular computing device. The security accounts can be cloud-based and accessible using credentials, such as an identification and a password. Techniques described herein can allow a computing device in recovery mode to receive credentials for one or more security accounts on a single computing device in order to obtain a recovery password for unlocking the computing device, rather than having to use a second computing device to access the cloud-based security accounts when the computing device is in recovery mode. In various examples, techniques described herein can include prompting a user for security account credentials, accessing the cloud-based databases of the security accounts, parsing and/or searching the security accounts to identify or obtain a recovery password, and retrieving the recovery password to unlock the encrypted data on the computing device, all while in recovery mode. Thus, data can be recovered on a single device using credentials a user may already have memorized as opposed to using another device to access the security account and manually inputting the recovery password into the computing device in recovery mode.

The techniques described herein can be implemented in whole or in part by one or more system resources located on the computing device. As used herein, system resources refer to physical hardware resources of the computing device, such as processors (e.g., CPU, GPU, etc.), memory (e.g., RAM, ROM, etc.), and the like.

In some examples, the techniques can simplify the process of unlocking encrypted data on a computing device while maintaining security via the use of a user PIN to authorize the unlocking. Additionally, examples described herein can provide methods to recover data stored on devices using a shorter recovery password, or security account credentials, while maintaining an appropriate level of security as a lengthy recovery password.

This brief introduction is provided for convenience and illustration. This introduction is not meant to limit the scope of the claims, nor the proceeding sections. Furthermore, the techniques described in detail below can be implemented in a number of ways and in a number of contexts. Example embodiments are provided with reference to the following figures, as describe below in more detail. It is to be appreciated, however, that the following other embodiments are contemplated.

Example Environment

FIG. 1 is a block diagram depicting an example environment for unlocking encrypted data stored on a consumer device. In some examples, the various devices and or components of environment 100 include consumer device(s) 102 that can communicate with other devices via one or more network(s) 104. For example, consumer device(s) 102 can communicate over network(s) 104 to test computing device(s) 108, security service(s) 106, or partly on both.

Network(s) 104 can include public networks such as the Internet, private networks such as an institutional and/or personal intranet, or some combination of private and public networks. Network(s) 104 can also include any type of wired and/or wireless network including, but not limited to, local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). For instance, support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In some examples, consumer device(s) 102 can include any type of computing device that is unable to boot in a normal system boot process, or contains data that is encrypted using various encryption mechanisms. In some examples, consumer device(s) 102 can boot into a recovery environment (i.e., recovery mode, flash mode, etc.).

In various examples, consumer device(s) 102 can include consumer device(s) 102(1)-102(N). Consumer device(s) 102 can belong to a variety of categories or classes of devices such as traditional client-type devices, desktop computer-type devices, mobile devices, special purpose-type devices, embedded-type devices, Internet of Things (IoT) devices, and/or wearable-type devices. By way of example and not limitation, consumer device(s) 102 can include, but are not limited to, server computers or blade servers such as Web servers, map/reduce servers or other computation engines, or network-attached-storage units, laptop computers, thin clients, terminals, or other mobile computers (e.g., 102(1)), computer navigation client computing devices, satellite-based navigation system devices including global positioning system (GPS) devices and other satellite-based navigation system devices, personal data assistants (PDAs), and other specialized portable electronic devices, tablet computers or tablet hybrid computers (e.g., 102(2)), smartphones, mobile phones, mobile phone-tablet hybrid devices, or other telecommunication devices (e.g., 102(3)), portable or console-based gaming devices or other entertainment devices such as network-enabled televisions, set-top boxes, media players, cameras, or personal video recorders (PVRs) (e.g., 102(4), represented graphically as a gamepad), automotive computers such as vehicle control systems, vehicle security systems, or electronic keys for vehicles (e.g., 102(5), represented graphically as an automobile), wearable computers such as smart watches or biometric or medical sensors, implanted computing devices such as biometric or medical sensors, or fixed sensors, such as IoT sensors, configured to monitor time, environmental conditions, vibration, motion, or other attributes of the world or structures or devices therein, e.g., bridges or dams (e.g., 102(N), represented graphically as a clock) desktop computers, or integrated components for inclusion in computing devices, appliances, or other computing device(s).

Consumer device(s) 102 can represent any type of computing device having one or more processing unit(s) 110 operably connected to computer-readable media 112 such as via a bus 114, which in some instances can include one or more of a system bus, a data bus, an address bus, a PCI bus, a Mini-PCI bus, and any variety of local, peripheral, and/or independent buses.

Computer-readable media 112 can include volatile memory, such as Random Access Memory (RAM) and/or non-volatile memory, such as read only memory (ROM) or flash RAM. Computer-readable media 112 includes at least two types of computer-readable media, namely computer storage media and communications media.

Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media can embody computer-readable instructions, data structures, program modules, or other data that is defined in a modulated data signal, such as in conjunction with a carrier wave. As defined herein, computer storage media does not include communication media.

Computer-readable media 112 can store executable instructions which can include, for example, operating system 116, data store 118, and various modules, programs, and/or applications that are loadable and executable by processing unit(s) 110. In some instances, computer-readable media 112 can correspond to a primary data partition (e.g., C drive) or other partitions of consumer device(s) 102.

Consumer device(s) 102 can include one or more partition(s) 120. Partition(s) 120 can be parts of computer-readable media 112 of consumer device(s) 102 that have been partitioned, or split, into separate portions. In various examples, partition(s) 120 can include multiple partitions (e.g., Extensible Firmware Interface (EFI) System Partition and/or other partitions). Additionally, partition(s) 120 can store software 122, firmware 124, or a combination of both that are executable by processing unit(s) 110. In some examples, software 122, firmware 124, or a combination thereof, can facilitate a boot process into a recovery environment, recovery platform, or recovery mode. For example, if the primary system boot process fails, consumer device(s) 102 can boot into a recovery environment in which various repair, testing, and diagnostic tools can be run to facilitate system recovery of the primary system boot. In some examples, the recovery environment can be facilitated by software 122 and/or firmware 124 of partition(s) 120.

Consumer device(s) 102 can include Trusted Platform Module(s) (TPM) 126. In some examples, TPM 126 comprises a computer chip, such as a microcontroller. TPM 126 can be usable as a base or root of a chain of trust for consumer device(s) 102. For example, TPM 126 can always be trusted by consumer device(s) 102 for use in securing various platforms of consumer device(s) 102. TPM 126 can be included a separate microprocessor, other than processing unit(s) 110, in some examples in order to serve as a separate, and shielded, computing engine to keep the root of trust uncompromised. Accordingly, TPM 126 can, in some examples, be used to securely store various artifacts (e.g., passwords, certificates, encryption keys, etc.) used to authenticate different platforms or partitions of consumer device(s) 102. In some examples, TPM 126 can be a portable, removable device. For instance, TPM 126 can include a platform stored on a separate device that is able to be removeably coupled to consumer device(s) 102 and interface with consumer device (102) via network interface(s) 130. In some examples, TPM 126 comprises one or more of a hardware-based TPM, a firmware-based TPM (fTPM), and/or a software-based TPM emulator.

Consumer device(s) 102 can further include one or more input/output (I/O) interface(s) 128 to allow consumer device(s) 102 to communicate with input/output devices, such as user input devices, including peripheral input devices (e.g., a keyboard, a mouse, a voice input device, a touch input device, a gestural input device, and the like) and/or output devices including peripheral output devices (e.g., a display, a printer, audio speakers, and the like). Consumer device(s) 102 can also include one or more network interface(s) 130 to enable communications between consumer device(s) 102 and other networked devices. Such network interface(s) 130 can include one or more network interface controllers (NICs) or other types of transceiver devices to send and receive communications over network(s) 104. For simplicity, other components are omitted from the illustrated consumer device(s) 102.

In some examples, consumer device(s) 102 can communicate over network(s) 104, via network interface(s) 130, to one or more security service(s) 106. In some examples, security service(s) 106 can comprise various distributed computing resources 132(1)-132(N) that can communicate with one another and with external devices via network(s) 104. In some examples, distributed computing resources 132(1)-132(N) can include one or more computing devices that operate in a cluster or other grouped configuration to share resources, balance load, increase performance, provide fail-over support or redundancy, and/or for other purposes (e.g., in-house server, dedicated server, cloud-based server, etc.). Distributed computing resources 132(1)-132(N) can belong to a variety of categories or classes of devices such as traditional server-type devices, desktop computer-type devices, mobile devices, special purpose-type devices, embedded-type devices, and/or wearable-type devices. Thus, although illustrated as desktop computers, distributed computing devices 132(1)-132(N) can include a diverse variety of device types and are not limited to a particular type of device. Distributed computing resources 132(1)-132(N) can represent, but are not limited to, desktop computers, server computers, web-server computers, personal computers, mobile computers, laptop computers, tablet computers, thin clients, terminals, work stations, integrated components for inclusion in a computing device, or any other sort of computing device.

Security service(s) 106 can include any type of computing device having one or more processing unit(s) 134 communicatively coupled to computer-readable media 138, such as by bus 136. Bus 136 can include one or more of a system bus, a data bus an address bus, a PCI bus, a Mini-PCI bus, and any variety of local, peripheral, and/or independent buses. Executable instructions stored on computer-readable media 138 can include, for example, an operating system 140, an authentication module 142, and other modules, programs, or applications that are loadable and executable by processing units(s) 134.

Authentication module 142 can be used to perform some of and/or all of the authentication of credentials and/or device information associated with consumer device(s) 102, or a user associated with consumer device(s) 102.

Alternatively, or in addition, the functionality described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from XILINX or ALTERA that includes a CPU course embedded in an FPGA fabric.

Security service(s) 106 can also include one or more network interface(s) 144 to facilitate communications between consumer device(s) 102, test computing device(s) 108, and other networked devices over network(s) 104. Such network interface(s) 144 can include one or more network interface controllers (NICs) or other types of transceiver devices to send and receive communications over a network.

In some examples, security service(s) 106 can communicate over network(s) 104, via network interface(s) 144, to test computing device(s) 108. In some examples, test computing device(s) 108 can serve as an intermediary between consumer device(s) 102 and security service(s) 106 by communicating on behalf of consumer device(s) 102. In other examples, consumer device(s) 102 can communicate directly with security services 108. Further discussion of these various examples will be discussed below with reference to FIGS. 4-6.

Test computing device(s) 108 can comprise any type of computing device having one or more processing unit(s) 146 communicatively coupled to computer-readable media 150, such as by bus 148. Bus 148 can include one or more of a system bus, a data bus an address bus, a PCI bus, a Mini-PCI bus, and any variety of local, peripheral, and/or independent buses. Executable instructions stored on computer-readable media 150 can include, for example, an operating system 152, an unlock module 154, and other modules, programs, or applications that are loadable and executable by processing units(s) 146. Unlock module 154 can be used to interact with consumer device(s) 102 and/or security service(s) 106 to enable verification of consumer device(s) 102 and unlocking of data or volumes contained on consumer device(s) 102.

Test computing device(s) 108 can further include one or more input/output (I/O) interface(s) 156 to allow test computing device(s) 156 to communicate with input/output devices such as user input devices including peripheral input devices (e.g., a keyboard, a mouse, a voice input device, a touch input device, a gestural input device, and the like) and/or output devices including peripheral output devices (e.g., a display, a printer, audio speakers, and the like). In some examples, unlock module 154 can prompt a user of test computing device(s) 108 to enter various information via I/O interface(s) 156. Additionally, unlock module 154 can employ I/O interface(s) 156 to receive data such as data that is associated with consumer device(s) 102, a user associated with consumer device(s) 102, network(s) 104, and/or security service(s) 106.

Test computing device(s) 108 can also include one or more network interface(s) 158 to enable communications between test computing device(s) 108 and other networked devices. Such network interface(s) 158 can include one or more network interface controllers (NICs) or other types of transceiver devices to send and receive communications over network(s) 104.

Example Devices

Figure 2:
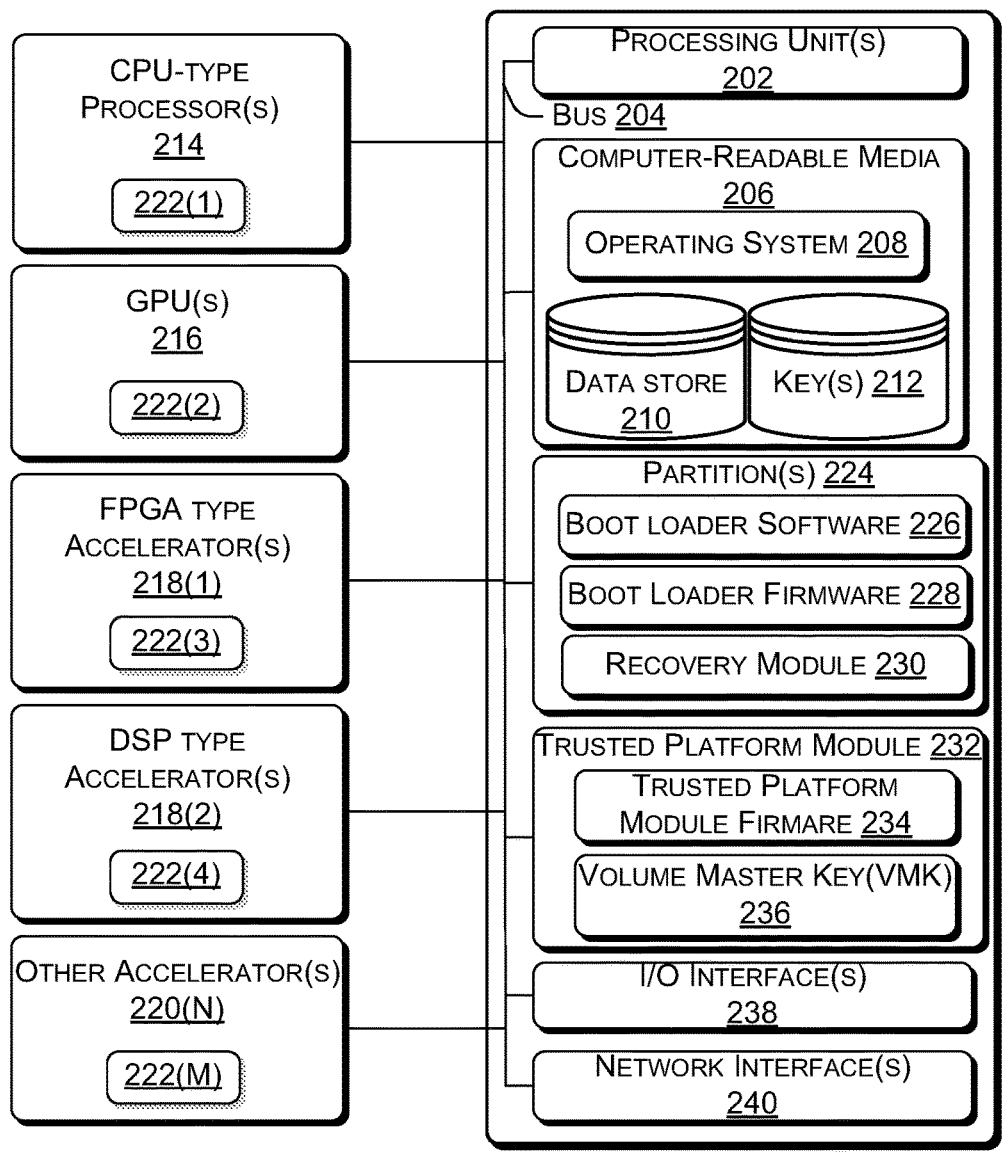
FIG. 2 is a block diagram depicting an example consumer device.

FIG. 2 is a block diagram depicting an example computing device 200, such as consumer device(s) 102 illustrated in FIG. 1. Consumer device(s) 102 can include processing unit(s) 202 which can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

In the illustrated example, processing unit(s) 202 can be communicatively coupled, via bus 204, to computer-readable media 206 which can store instructions executable by processing unit(s) 202. Computer-readable media 206 can also store instructions executable by an external CPU type processor(s) 214, executable by a GPU(s) 216, and/or executable by an accelerator 222, such as an FPGA type accelerator(s) 218(1), a DSP type accelerator(s) 218(2), or any internal or external accelerator 218(N). In various examples, at least one GPU(s) 216 and/or accelerator(s) 222 is incorporated in consumer device(s) 102, while in some examples one or more of GPU(s) 216 and/or accelerator(s) 222 are external to consumer device(s) 102, as illustrated in FIG. 2. Executable instructions stored on computer-readable media 206 can include, for example, an operating system 208 and other modules, programs, or applications that are loadable and executable by processing unit(s) 110, 202, 214, 216, and/or 218.

In some examples, data store 210 can include data storage such as a database, data warehouse, or other type of structured or unstructured data storage. In some examples, data store 210 can include a relational database with one or more tables, indices, stored procedures, and so forth to enable data access. Data store 210 can store data for the operations of processes, applications, components, and/or modules stored in computer-readable media 206 and/or executed by processor(s) 110, 202, 214, and/or 216, and/or accelerator(s) 218. Alternatively, some or all of the above-referenced data can be stored on separate memories 222, such as a memory 222(1) on board a CPU type processor 214, memory 222(2) on board a GPU(s) 216, memory 222(3) on board an FPGA type accelerator 218(1), memory 222(4) on board a DSP type accelerator 218(2), and/or memory 222(M) on board another accelerator 220(N).

Consumer device(s) 102 can further comprise partition(s) 224, as described in FIG. 1. Partition(s) 224 can comprise boot loader software 226, boot loader firmware 228, recovery module 230, and/or other various programs, modules, and data. For example, one or more partition(s) 224 can include a system boot partition, such as the Extensible Firmware Interface (EFI) System Partition, which can store boot loader software 226 and/or boot loader firmware 228. In some examples, EFI System Partition may not be encrypted and can allow a boot process to proceed until a certain point, such as when operating system 208 would be loaded. However, when consumer device(s) 102 is in recovery mode, TPM 232 and/or the encryption of computer-readable media 206 may not allow the EFI System Partition to load operating system 208.

In some examples, computer-readable media 206 of consumer device(s) 102 can be locked, encrypted, or otherwise inaccessible. For example, TPM 232 may determine that certain files of operating system 208 have been altered and it can lock out access to computer-readable media 202, and can force consumer device(s) to boot into a recovery mode. In other examples, computer-readable media 206 can have been encrypted using various encryption mechanisms (e.g., BitLocker®, FileVault®, etc.).

In various examples, key(s) 212 can comprise one or more symmetric, and/or asymmetric, keys for use in encryption of data. In some examples, key(s) 212 can comprise one or more Full Volume Encryption Keys (FVEK) used to encrypt and/or decrypt data, such as data in data store 210. In some examples, various encryption mechanisms (e.g., Bit-Locker®, FileVault®, etc.) can be full volume encryption mechanisms, meaning they encrypt an entire volume of data. Although key(s) 212 can be used to encrypt or decrypt data, in some examples, an encrypted volume can comprise an entire data partition, several data partitions, or part of a data partition. In examples in which an entire partition is encrypted in a single volume, such as computer-readable media 206 comprising a volume, key(s) 212 may not be accessible as they can be contained in the encrypted volume. Accordingly, in some examples, TPM 232 can include one or more Volume Master Keys (VMK) 236. VMK 236 can be used to access key(s) 212, such as FVEK, which in turn are usable to decrypt, or unlock, the encrypted volume (e.g., computer-readable media 206). Thus, unlocking or accessing key(s) 212 and/or VMK 236 can make data stored in computer-readable media 206 accessible. To protect key(s) 212 and/or VMK 236, various mechanisms called "protectors" can be employed.

In some examples, a protector (e.g., TPM 232) can verify that data contained in operating system 208, data store 210, boot loader software 226, boot loader firmware 228, and/or various other information stored in consumer device(s) 102 has not been changed or compromised. If the protector determines that the integrity of data contained in consumer device(s) 102 has not been compromised or changed, the protector can allow key(s) 212 and/or VMK 236 to be accessed for use in interpreting the encrypted data on the encrypted volume or partition. In various examples, a protector can include a recovery key, which is a lengthy password (e.g., 48 characters, 64 characters, 72 characters, etc.). Acceptance of such as password by consumer device(s) 102 can unlock key(s) 212 and/or VMK 236 for use.

In some examples, a TPM 232 can be a portable, removable device. For instance, TPM 232 can be a platform stored on a separate device that is able to be removeably coupled to consumer device(s) 102. TPM 232 can include a wired interface or a wireless interface, which is capable of interfacing with consumer device(s) 102 through network interface(s) 240. The wired interface can include a mechanical connection such as a Universal Serial Bus (USB) connection or another plug or socket. The wireless interface can include a wireless interface capable of exchanging data over short distances. For example, the wireless interface can be an interface that operates on short-wavelength ultra-high frequency radio waves, such as that provided for in the Bluetooth standard. In another aspect, the wireless interface can be an interface based on the IEEE 802.11 standards, i.e., a Wi-Fi interface. Further, the wireless interface can include a near-field communication (NFC) interface that is established based on NFC standards.

Consumer device(s) 102 can further include one or more input/output (I/O) interface(s) 238 to allow consumer device(s) 102 to communicate with input/output devices such as user input devices including peripheral input devices (e.g., a keyboard, a mouse, a voice input device, a touch input device, a gestural input device, and the like) and/or output devices including peripheral output devices (e.g., a display, a printer, audio speakers, and the like). Consumer device(s) 102 can also include one or more network interface(s) 130, as illustrated in FIG. 1 to enable communications between consumer device(s) 102 and other networked devices.

Bus 204 can include one or more of a system bus, a data bus, an address bus, a PCI bus, a Mini-PCI bus, and any variety of local, peripheral, and/or independent buses, can operably connect computer-readable media 206, partition(s) 224, TPM 232, and I/O interface(s) 238 to processing unit(s) 202.

Figure 3A:
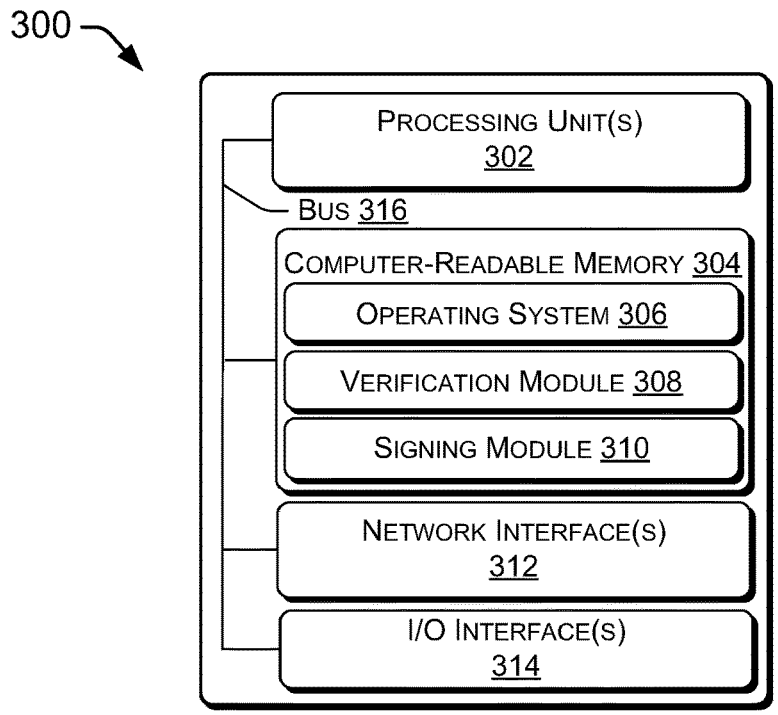
FIGS. 3A and 3B are block diagrams depicting example security services.
Figure 3B:
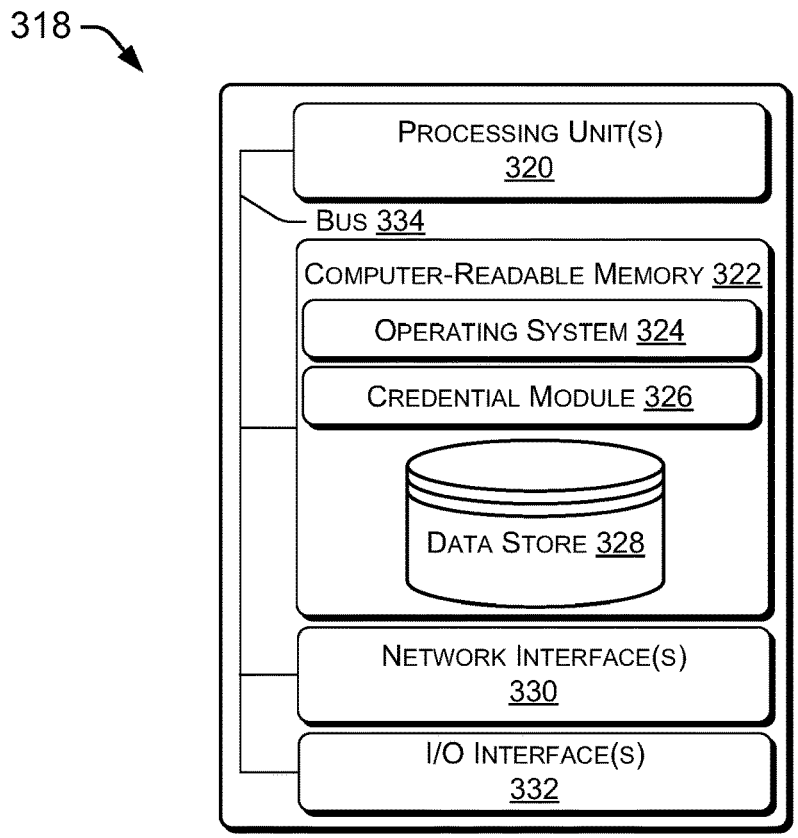

FIGS. 3A and 3B are block diagrams depicting example security services 300 and 318, which can correspond to security service(s) 106 illustrated in FIG. 1. Security service(s) 106 can include processing unit(s) 302 which can represent, for example, a CPU-type processing unit, a GPU-type processing unit, a field-programmable gate array (FPGA), another class of digital signal processor (DSP), and/or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

As shown in FIG. 3, security service(s) 106 can have computer-readable memory 304 which stores verification module 308 and/or signing module 310. In some examples, verification module 308 and signing module 310 can be included in authentication module 142, illustrated in FIG. 1.

Verification module 308 can be usable to verify various device information, such as information associated with consumer device(s) 102. In some examples, verification module 308 can receive a request for an unlock token to unlock consumer device(s) 102, where the request includes information associated with consumer device(s) 102, such as a device ID, OEM information, and/or an unlock type requested. Verification module 308 can verify the device ID and/or the OEM information associated with consumer device(s) 102, for example, by using one or more authentication directories, such as Azure Active Directory. In some examples, verification module 308 can verify that the provided device information is correct according to the one or more authentication directories.

If verification module 308 verifies the device information associated with the request for the unlock token, signing module 308 can sign an unlock token. The unlock token can comprise any type of data file, such as text, and contain one or more parameters. For example, the signed unlock token can specific the device ID, OEM information, and/or an unlock type for consumer device(s) 102. This can ensure that the signed unlock token is only usable to unlock consumer device(s) 102, and only to the depth specified by the unlock type. For example, the signed unlock token may only allow debugging in some examples; in other examples, it may additionally allow test signing. Additionally, in some examples where security service(s) 106 are provided by an OEM, the OEM information contained in the signed unlock token can limit the tokens applicability to only equipment manufactured by the signing OEM. In this way, OEMs can provide unlock tokens for equipment manufactured by them, and not for all devices or equipment.

In some examples, security service(s) 106 can communicate the signed unlock token over network(s) 104 using network interface(s) 312. In some instances, the signed unlock token can be communicated to the requesting entity, which can be consumer device(s) 102, test computing device(s) 108, or both.

FIG. 3B illustrates a further example of a security service 318, such as security service(s) 106. In FIG. 3B, security service(s) 106 can have processing unit(s) 320 and computer-readable media 322. Computer-readable media 322 can comprise Operating System 324, credential module 326, and data store 328. In some examples, credential module 326 and data store 328 can be part of authentication module 142, illustrated in FIG. 1.

In some examples, credential module 326 can receive credentials associated with a locked consumer device, such as consumer device(s) 102. The credentials can comprise an ID and password usable to gain access to data store 328. Upon receiving the credentials, credential module 326 can verify that a valid ID and password are entered and allow access to data store 328, and/or a portion of a data store associated with the user ID and password.

Data store 328 can store various information associated with one or more devices of a user of consumer device(s) 102. For example, a recovery password associated with several disparate devices (e.g., laptop, phone, tablet, etc.) of a user can be stored in data store 328. In some examples, data store 328 can store one or more recovery passwords associated with consumer device(s) 102 and usable to unlock data stored in computer-readable media 322 of consumer device(s) 102.

Example Timing and Event Diagrams

Figure 4:
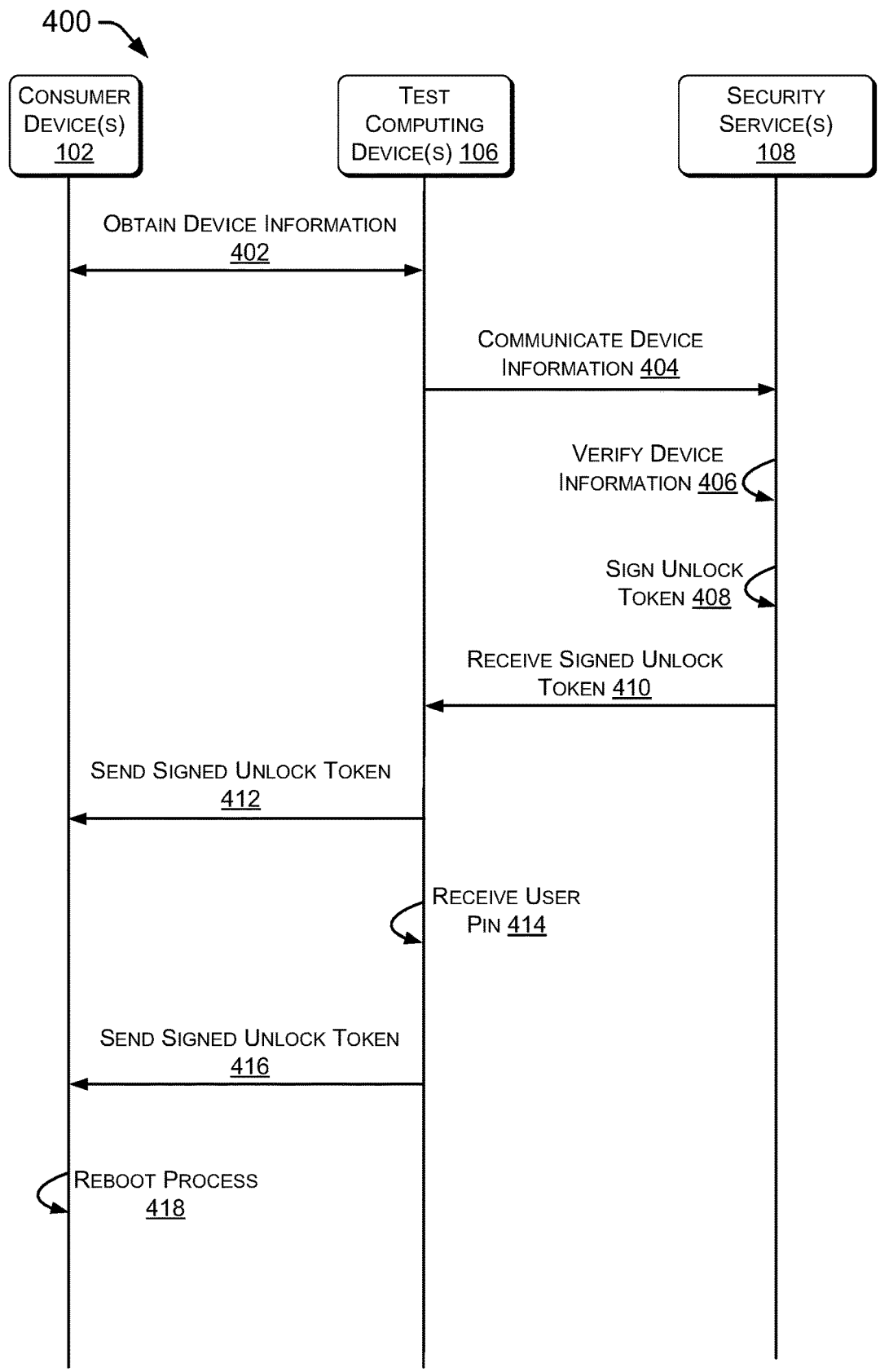
FIG. 4 is an example timing and event diagram showing an example approach for unlocking encrypted data stored on a computing device.

FIG. 4 is an example timing and event diagram 400 showing an example approach for unlocking encrypted data stored on a computing device, such as consumer device(s) 102. The activities shown in the example approach for unlocking encrypted data can be performed at consumer device(s) 102, test computing device(s) 108, security service(s) 106, and/or by any combination of the three. In some instances, one or more of the activities discussed below can be performed by recovery module 230, unlock module 154, or a combination thereof.

At "obtain device information" event 402, consumer device(s) 102 can receive a request from test computing device(s) 108. In some examples, software, firmware, and/or hardware for performing this operation can be included in the recovery module 230 of consumer device(s) 102 and/or the unlock module 154 of text computing device(s) 106. The request can be sent and received via network interface(s) 130 and network interface(s) 158 over network(s) 104. In some examples, the request can comprise a request for information associated with consumer device(s) 102. For example, the information can comprise a device identification number (device ID) and/or various information associated with an OEM of equipment of consumer device(s) 102. The device ID can comprise a unique, distinctive number generated when the device is created. In response to the request sent from test computing device(s) 106, consumer device(s) 102 can respond with the requested device information.

At "communicate device information" event 404, the device information is sent from test computing device(s) 108, via network interface(s) 158, over network(s) 104, and is received by network interface(s) 144 of security service(s) 106. In some examples, security service(s) 106 can be a software provider (e.g., Microsoft®, Apple®, Google®, etc.) associated with various software modules of consumer device(s) 102, such as operating system 116. Additionally or alternatively, security service(s) 106 can be an OEM (e.g., Samsung®, LG®, etc.) associated with equipment of consumer device(s) 102. Along with the device information, a request for an unlock token is sent to security service(s) 106. The unlock token requested can be usable to unlock, or bypass, security restrictions associated with consumer device(s) 102, such as a PIN. The request for the unlock token can further comprise a requested level of unlock type for the unlock token to allow. For instance, depending on the unlock type requested, the signed unlock token can be more, or less, permissive regarding interaction with consumer device(s) 102. For example, one unlock type can only allow debuggers to be used on consumer device(s) 102, whereas a "deeper," or more permissive unlock type, can allow debuggers and test signing for consumer device(s) 102.

At "verify device information" event 406, security service(s) 106 can verify, based on the received device information, that the requesting entity (e.g., consumer device(s) 102 and/or test computing device(s) 108) actually has possession of consumer device(s) 102. For example, verification module 308 of security service(s) 106 can authenticate the request for the unlock token using the device ID and an authentication directory.

At "sign unlock token" event 408, signing module 310 of security service(s) 106 can sign an unlock token if the device information sent by test computing device(s) 108 is correct, or authentic. The unlock token can be any type of data file and contain various parameters associated with it. In some examples, the unlock token can contain parameters such as the device ID, OEM information, and/or an unlock type associated with the signed unlock token. For example, as there are a large amount of different OEMs, the OEM information contained in the unlock token can only allow OEMs to provide unlock tokens for equipment they manufactured. This can prevent OEMs from permitting, or gaining, access to equipment manufactured by a different OEM.

At "receive signed unlock token" event 410, security service(s) 106 can send, via network interface(s) 144 and over network(s) 104, the signed unlock token to test computing device(s) 108 via network interface(s) 156.

At "send signed unlock token" event 412, test computing device(s) 108 can send the signed unlock token to consumer device(s) 102. For example, test computing device(s) 108 can store or install the signed unlock token to one or more locations on consumer device(s) 102. In some examples, the signed unlock token can be installed to partition(s) 120 of consumer device(s) 102, such as at boot loader software 226, boot loader firmware 228, or a partly on both. In some examples, partition(s) 120 can comprise an EFI System Partition of consumer device(s) 102.

At "receive pin" event 414, test computing device(s) 108 can receive a PIN associated with a user, or owner, of consumer device(s) 102. In some examples, unlock module 154 of test computing device(s) 108 can prompt a user of test computing device(s) 108 to enter the pin, such as by presenting one or more user interfaces via I/O interface(s) 158. In some examples, pin can be the same as, or different than, the PIN used to access consumer device(s) 102 in a normal system boot sequence. By requiring a PIN of a user associated with consumer device(s) 102, this can prevent unauthorized access to consumer device(s) without permission of the user and/or owner of consumer device(s) 102. In various examples, an entity operating test computing device(s) 108 can be someone other than the user/owner of consumer device(s) 102 (such as an OEM), and by requiring a user defined PIN, only express authorization from the user/owner of consumer device(s) 102 can be used to unlock consumer device(s) 102.

At "send pin" event 416, unlock module 154 of test computing device(s) 108 can, using the PIN, install a second file to partition(s) 120 of consumer device(s) 102. In some examples, the second file can be associated with the various encryption mechanisms used to encrypt computer-readable media 112 on consumer device(s) 102. For example, the pin can allow a file associated with the encryption mechanism to be installed to partition(s) 120 which unlocks key(s) 212, VMK 212, and/or other encryption keys for use in interpreting encrypted data on computer-readable media 112.

At "reboot process" event 418, consumer device(s) 102 can reboot in a normal system reboot process. During the reboot process, boot loader firmware 228 and/or boot loader software 226 can determine whether the signed unlock token is authentic. For example, it can be determined that the signed unlock token is signed by an appropriate entity (e.g., OEM and/or software provider), whether the signed unlock token is signed for the consumer device(s) (e.g., the OEM information in the signed unlock token is associated with the equipment of consumer device(s) 102), and what unlock type is associated with the signed unlock token. If the signed unlock token is determined to be authenticate, the system boot process can unlock the computing device, based on the unlock type associated with the unlock token. However, while consumer device(s) 102 can be unlocked, data contained in computer-readable media 112 and/or partition(s) 120 of consumer device(s) 102 can still be encrypted such that the system boot process can be unable to read the data and load operating system 116. Accordingly, boot loader software 226 and/or boot loader firmware 228 can access the file associated with the PIN to determine that the system boot process is authorized by the user/owner of consumer device(s) 102. By accessing the file associated with the PIN, boot loader software 226 and/or boot loader hardware can be able to unlock key(s) 212 and/or VMK 212 such that encrypted data on consumer device(s) 102 can be accessed.

In various examples, some or all of the events (e.g., events 402, 412, 414, and 416) can occur using a Full Flash Update (FFU) process. For example, because consumer device(s) 102 are in a recovery mode and various functionalities are not accessible (such as the Operating System), an FFU tool can be used to flash an image to firmware of consumer device(s) 102. For instance, the unlock token can comprise an FFU image that has been signed by an OEM. Installing the FFU image can, in some examples, comprise running an FFU tool, or "flashing" the image, to a data partition of consumer device(s) 102. In some examples, the FFU tool can flash the FFU image (e.g., signed unlock token) to a memory chip located on a motherboard of consumer device(s) 102, such as the Basic Input/Output System (BIOS) which can define system and/or boot parameters of consumer device(s) 102. By flashing the FFU image, the firmware stored on the BIOS can be updated to include the FFU image. By doing this, when "reboot process" event 418 occurs at consumer device(s) 102, the firmware can determine that the FFU image has been signed by an authenticated OEM (or other entity) and unlock the device, or allow boot into a normal operating mode.

In some examples, one or more of events 402-418 can be described as implementing another type of "protector" for the key(s) 212 and/or VMK 212, as was discussed with reference to FIG. 2. For example, by requiring a pin at event 414, a protector can be considered as being implemented. Additionally, it should be noted that events 402-418 are merely illustrative of one embodiment of performing the events, and in other implementations certain events can be re-ordered with respect to timing of the events.

Figure 5:
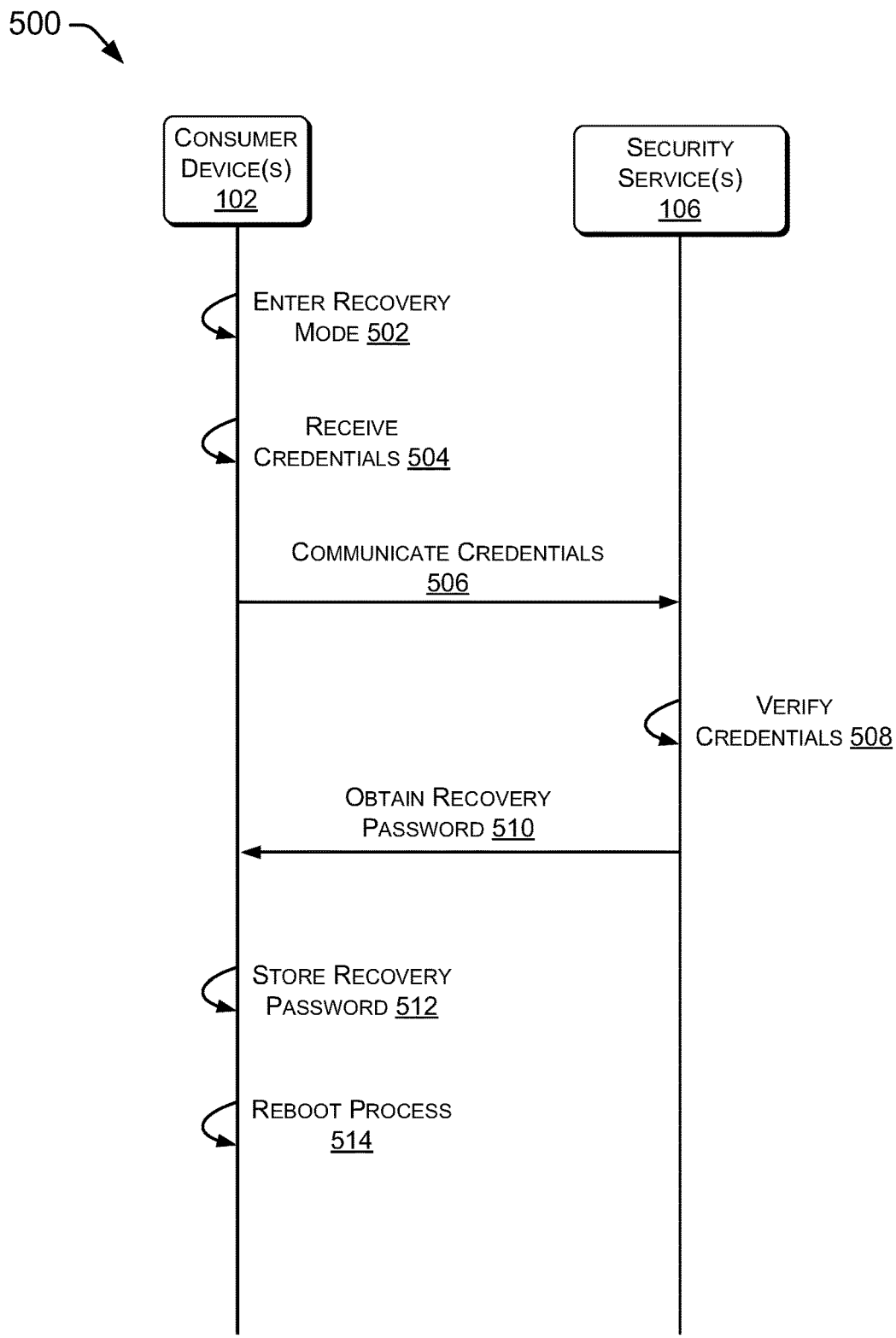
FIG. 5 is an example timing and event diagram showing an example approach for recovering encrypted data stored on a computing device

FIG. 5 is an example timing and event diagram 500 showing an example approach for recovering encrypted data stored on a computing device, such as consumer device(s) 102. The events shown in the example approach can be performed at consumer device(s) 102 and/or at security service(s) 106. For example, events of the timing and event diagram 500 can be implemented at least in part by recovery module 230, credential module 326, or a combination of both.

At "enter recovery mode" event 502, consumer device(s) 102 enters a recovery mode, or recovery environment. In some examples, consumer device(s) 102 can be forced into recovery mode by TPM 126 due to problems or changes detected with data stored in computer-readable media 112.

At "receive credentials" event 504, consumer device(s) 102 can receive credentials, such as an ID and password, associated with one or more accounts. For example, the credentials can comprise log in information for various security accounts associated with a user of consumer device(s) 102 (e.g., Microsoft Account (MSA), Azure Active Directory (AAD), etc.). In some examples, consumer device(s) 102 can issue a prompt, via a user interface presented through one or more of I/O interface(s) 128, for entry of one or more credentials using one or more I/O interface(s) 128.

At "communicate credentials" event 506, the credentials received at the consumer device(s) 102 can be communicated via network(s) 104 to security service(s) 106. In some examples, network(s) 104 can include a public network by which consumer device(s) 102 can communicate over using network interface(s) 130 without any authentication. In other examples, network(s) 102 can be a private network which requires log in information. Consumer device(s) 102 may issue a prompt, such as a prompt for a network password, for entry of information for logging into the private network via I/O interface(s) 128. In other examples, consumer device(s) 102 can automatically locate information stored in partition(s) 120 and/or computer-readable media 112 that is associated with the private network(s) 104 and allows access to network(s) 104 to consumer device(s) 102.

At "verify credentials" event 508, security service(s) 106 can determine that the credentials are associated with a security account. In some examples, this can comprise recovery module 230 of consumer device(s) 102 inputting the received credentials into one or more input fields provided by I/O interface(s) 314 of security service(s) 106. Once credentials are received, credential module 326 of security service(s) 106 can verify the credentials, such as by checking a directory, to determine if an ID and password match, and allow access to data store 308 if the credentials are verified. If the credentials are not valid, or are not able to be verified, credential module 326 can prevent access to data store 308 by consumer device(s) 102.

At "obtain recovery password" event 510, recovery module 230 of consumer device(s) 102 can locate and obtain a recovery password associated with consumer device(s) 102. In some examples, security service(s) 106 can comprise a data store 308 with a defined structure and contain various security information associated with consumer device(s) 102 and/or a user of consumer device(s) 102. Recovery module 230 can parse and/or search through data store 308 to identify one or more recovery passwords associated with consumer device(s) 102. Once recovery passwords have been identified, recovery module 230 of consumer device(s) 102 can obtain the recovery password or passwords.

At "install recovery password" event 510, recovery module 230 of consumer device(s) 102 can install the recovery password or passwords to partition(s) 120. For instance, recovery password can be installed in boot loader firmware 228, which can be stored in an EFI System Partition.

At "reboot process" 512, consumer device(s) 102 can reboot into a normal system reboot process. During the reboot process, boot loader firmware 228 and/or boot loader software 226 can locate the recovery password installed in partition(s) 120. If the recovery password or passwords is determined to be authentic, boot loader software 226 and/or boot loader firmware 228 can be able to unlock key(s) 212 and/or VMK 236 such that encrypted data on consumer device(s) 102 can be accessed.

Figure 6:
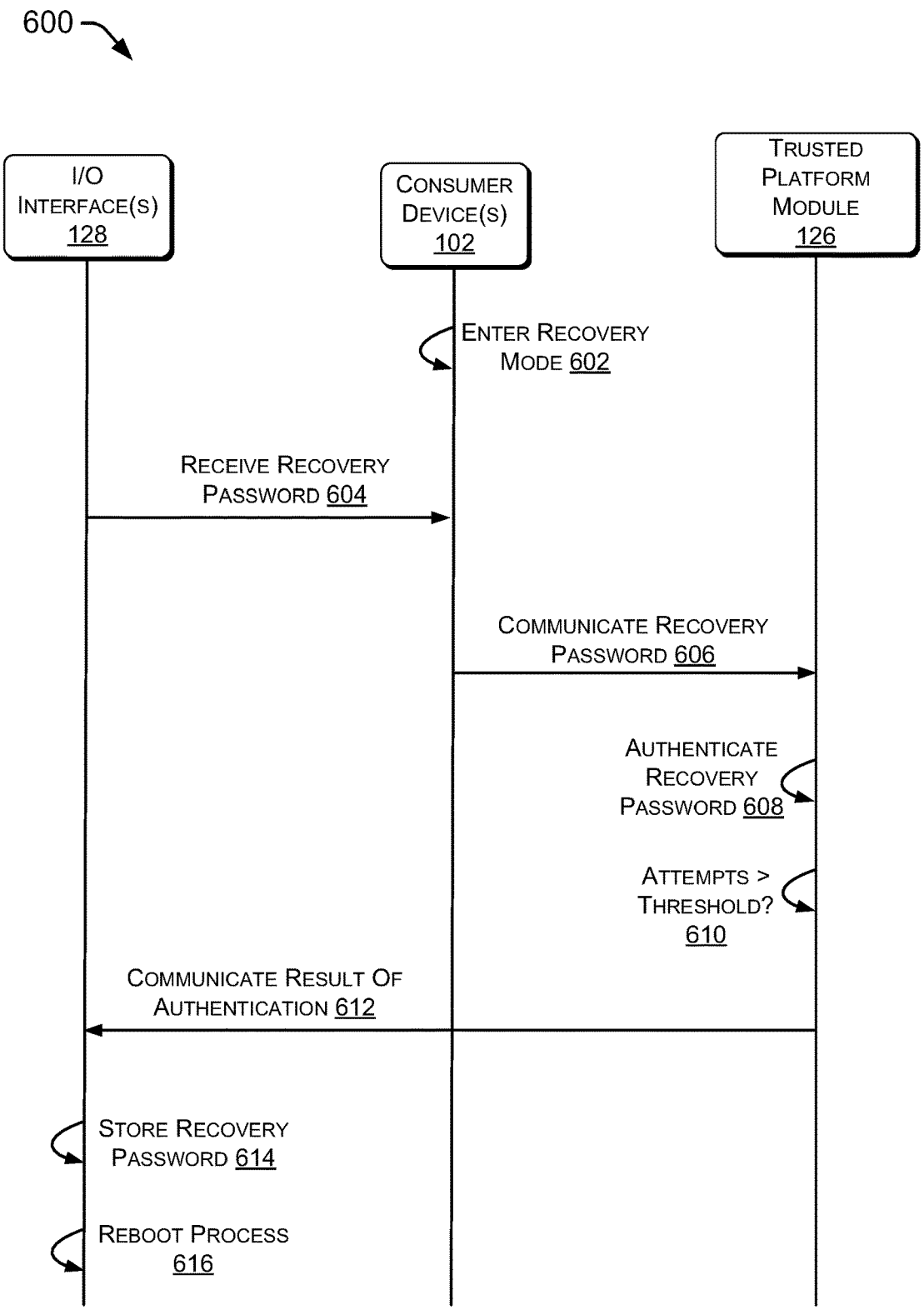
FIG. 6 is an example timing and event diagram showing another example approach for recovering encrypted data stored on a computing device.

FIG. 6 is an example timing and event diagram 600 showing an example approach for recovering encrypted data stored on a computing device, such as consumer device(s) 102. The events shown in the example approach can be performed at consumer device(s) 102. For example, events of the timing and event diagram 600 can be implemented at least in party by recovery module 230, I/O interface(s) 128, TPM 126, and/or any combinations thereof.

At "enter recovery mode" event 602, consumer device(s) 102 enters a recovery mode, or recovery environment. In some examples, consumer device(s) 102 can be forced into recovery mode by TPM 126 due to problems or changes detected with data stored in computer-readable media 112.

At "receive recovery password" event 602, a recovery password is received via I/O interface(s) 128. In some examples, I/O interface(s) 128 can prompt a user using one or more user interfaces to enter a recovery password. In some examples, the recovery password can be the same as a password used to unlock the consumer device(s) while booting in a normal system boot (e.g., 4-6 characters). I/O interface(s) 128 can present one or more fields in a user interface to facilitate entry of the recovery password. In various examples, the recovery password can be a short password (e.g., 4-5 characters) to enable a user to easily remember it. For example, the recovery password can be a portion (e.g., 4-6 characters) of the longer recovery password (e.g., 48 characters, 72 characters, etc.).

At "communicate recovery password" event 604, the password received via I/O interface(s) 128 can be sent to TPM 126, such as via bus 114.

At "authenticate recovery password" event 606, TPM 126 can determine whether or not the recovery password is valid. If TPM 126 determines that the recovery password is not valid, the process can revert back to event 602 and prompt a user of consumer device(s) 102 to attempt and enter a valid password.

At "attempts>threshold?" event 608, TPM 136 can determine if the recovery password has been incorrectly entered more than a threshold amount of times, then TPM 126 can lock out further password entry attempts for a period of time. It should be appreciated that the threshold amount of attempts and the period of time can be configurable to be any amount of attempts and any period of time. In various examples, the threshold number of attempts can be a lower number and the period of time can be long in order to prevent brute force attacks on the recovery password entry. In other words, an entity attempting to gain unauthorized entry will not be able to simply try a large amount of recovery passwords in the hope of finally reaching a valid password without being locked out for significant periods of time. This can result in added difficulty to gain access to encrypted information stored in consumer device(s) 102 by unauthorized entities.

In examples where the recovery password was authenticated at event 606, the TPM 126 can then release the longer recovery password (e.g., 48, 64, 72, etc. characters). In various examples, the longer recovery password can be protected (e.g., "wrapped" or encrypted) by one or more sealing operations performed by TPM 126. For example, TPM 126 can use one or more internal keys, such as a storage root key (SRK), that is embedded in the TPM 126 to encrypt the longer recovery password. However, if the shorter recovery password is authenticated, it can be used as an authentication value to unseal the longer recovery password for use in unlocking the consumer device(s) 104. Thus, if the shorter recovery password is authenticated, the shorter recovery password can be used as an authentication value for the seal (and unseal) operation to unlock the longer recovery key for use. Accordingly, the longer recovery key used to unlock consumer device(s) 102 can be wrapped, or sealed, using a sealing operation of the TPM 126 to ensure that the longer recovery key cannot be released without use of the internal sealing keys stored in the TPM 126. This sealing operation, or wrapping, of the longer recovery key can ensure that the TPM 126 must authorize release of the longer recovery key, thereby providing the TPM 126 an opportunity to utilize its anti-hammering capabilities by having to authenticate each attempt at entering the shorter recovery key.

At "store recovery password" 610, consumer device(s) 102 can store or install the recovery password (e.g., longer recovery password) to one or more locations on consumer device(s) 102. For instance, the recovery password can be installed to partition(s) 120 and/or computer-readable media 112. In some examples, recovery password can be installed to an EFI System Partition.

At "reboot process" 612, consumer device(s) 102 can reboot. In some examples, consumer device(s) 102 can be rebooted in the normal operating environment rather than recovery mode. During the normal boot process, boot loader software 226 and/or boot loader firmware 228 can locate the installed recovery password and determine that the boot process is authenticated, and the recovery password can unlock key(s) 212 and/or VMK 236 for use in decrypting data stored in encrypted partitions, such as computer-readable media 112 and/or various partitions of partition(s) 120.

Example Processes

While certain functions are described herein as being implemented by modules executable by one or more processors and other components, any or all of the modules or other components can be implemented in whole or in part by one or more hardware logic components to execute the described functions. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Further, while various modules are discussed herein, their functionality and/or similar functionality could be arranged differently (e.g., combined into a fewer number of modules, broken into a larger number of modules, etc.).

Figure 7:
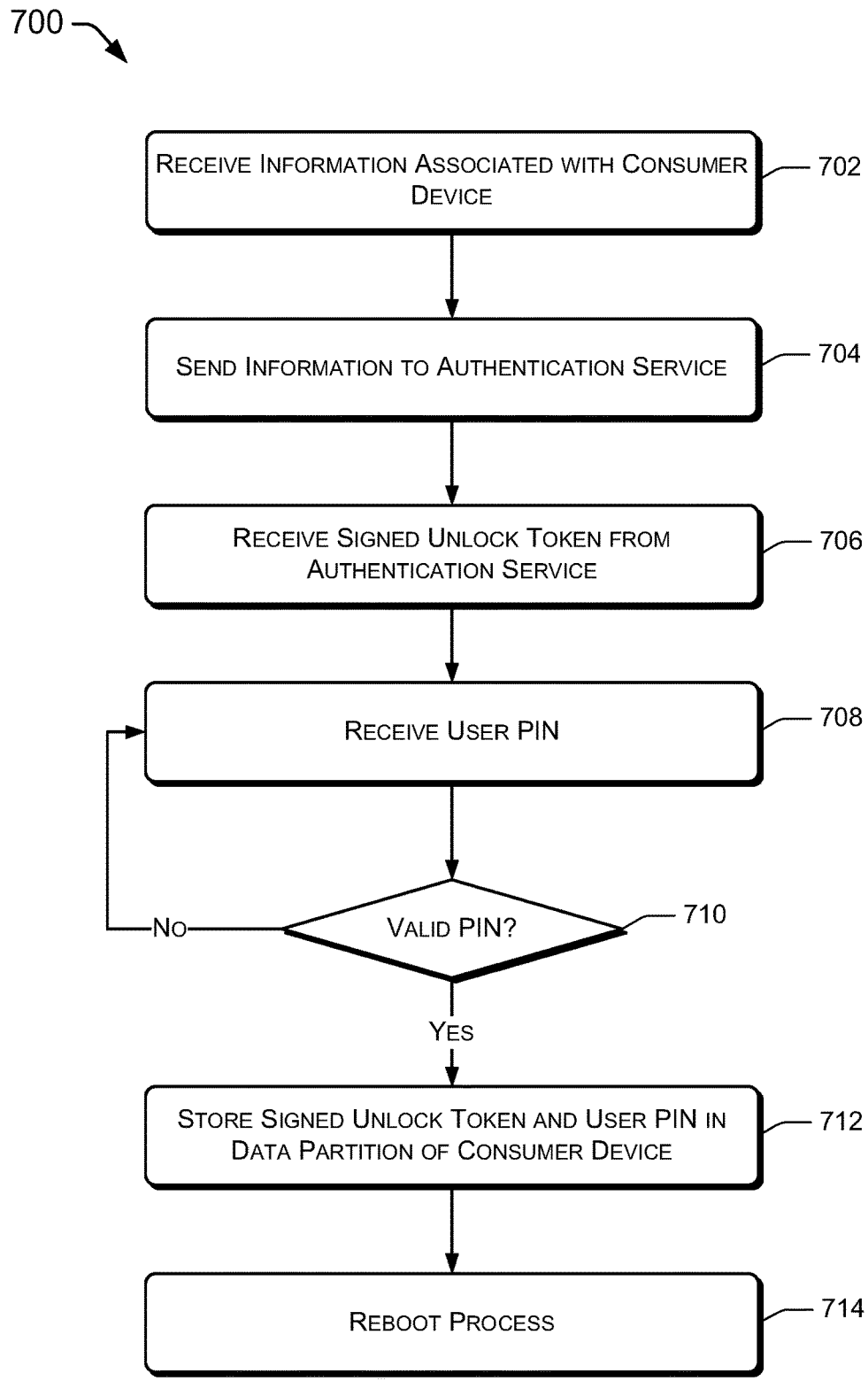
FIG. 7 is a flow diagram showing an example method to unlock encrypted data stored on a computing device.

FIG. 7 is a flow diagram showing an example method 700 to unlock encrypted data stored on a computing device. At 702, a computing device can receive device information associated with a consumer device in a recovery environment. In some examples, the device information can correspond to information associated with consumer device(s) 102. In various examples, the device information can be received at a test computing device, such as test computing device(s) 108. In some examples, the device information can include a device ID, which can be generated during the first boot of the consumer device, as well as various OEM information. In some examples, the device information can further include an unlock type (e.g., unlock level) request. For instance, the unlock type can specify that an unlock token allow debuggers, or allow debuggers and test signing.

At 704, a test computing device can send the device information to an authentication service, such as security service(s) 106. The authentication service can be a software developer, OEM, or other authentication service. The authentication service can verify the device ID and OEM information. For example, the authentication service can use one or more authentication directories to verify the device ID and corresponding OEM information. In some examples, the authentication service can be a cloud-based authentication service.

At 706, a test computing device can received a signed unlock token from the authentication service. For example, if the authentication service determines that the device ID and/or OEM information is correct, or authentic, it can sign an unlock token.

The unlock token can comprise one or more parameters, such as the device ID, OEM information, and/or an unlock type. The signed unlock token can be any type of data file, such as a text file. The signed unlock token can be received at the test computing device, or the consumer device. The signed unlock token can further be stored, or installed, to one or more partitions of the consumer device. For instance, the signed unlock token can be installed to an EFI System Partition of the locked consumer device.

At 708, the consumer device or the test computing device can receive a PIN. In some examples, an entity operating either the test computing device or the consumer device can be prompted, via a user interface, to enter a PIN. The PIN can be a PIN defined by an owner or operator of the consumer device. In some examples, the PIN can be the same as a PIN used to access consumer device in normal operating mode.

At 710, the consumer device or the test computing device can determine whether the PIN is valid or not. If the PIN is determined not to be valid, the flow can revert back to 708 and prompt entry of a valid PIN. If the PIN is valid, the flow can proceed past 710. By verifying that the PIN is valid, this step can ensure that the actual user or owner who defined the PIN is either entering the PIN, or authorizing an entity to enter the PIN. This may ensure that unauthorized entities cannot access consumer device without permission or authorization from the user and/or owner of the consumer device.

At 712, a test computing device or the consumer device can store, or install, the signed unlock token and PIN to one or more data partitions of the consumer device. While the signed unlock token and PIN are shown as being stored at the same step, it should be understood the signed unlock token can be stored prior to 708 in some examples. The signed unlock token and PIN can be stored in one or more partitions of consumer device, such as the EFI System Partition. In some examples, the EFI System Partition can facilitate the boot process of the consumer device.

At 714, the consumer device can reboot. For example, the consumer device can restart and attempt to boot into a normal boot process, rather than recovery mode. In some examples, the boot process can identify that the signed unlock token and PIN are installed in the correct locations and are valid. In various examples, the signed unlock token can unlock the consumer device. However, one or more partitions of consumer device can remain encrypted. The PIN can enable the unlocking of one or more keys used to access the encrypted information.

Figure 8:
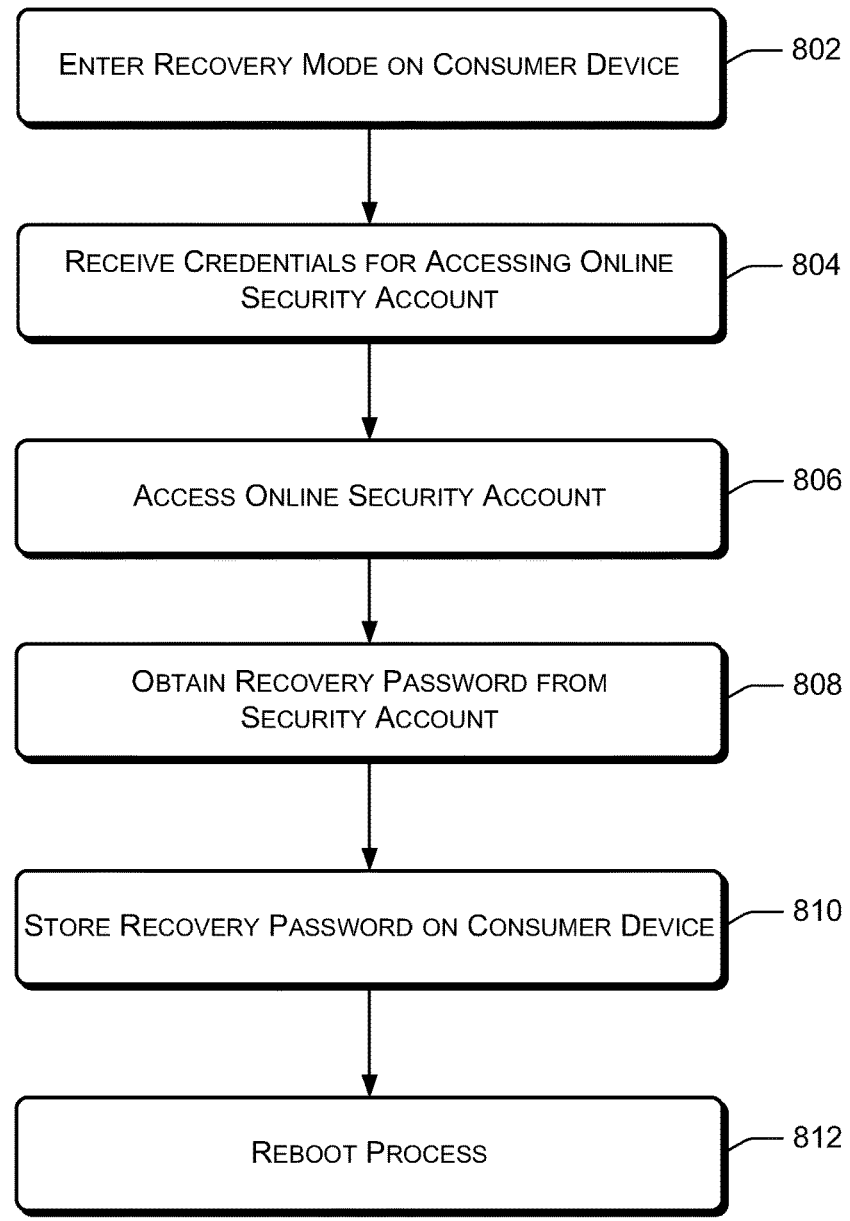
FIG. 8 is a flow diagram showing an example method to recover encrypted data stored on a computing device.

FIG. 8 is a flow diagram showing an example method 800 to recover encrypted data stored on a consumer device. At 802, a consumer device becomes a locked device by entering a recovery mode, or recovery environment. In some examples, the consumer device can be forced into recovery mode by a TPM due to problems or changes detected with data stored in computer-readable media. In various examples, the recovery mode operates in an environment separate from a normal operating environment. For example, in recovery mode information stored in a primary partition where the operating system is stored may not be accessible because the primary partition is encrypted.

At 804, a consumer device can receive credentials associated with the consumer device. In some examples, the consumer device can prompt a user, using one or more output mechanisms such as a user interface on a display screen, to enter credentials. In some examples, the credentials can be an ID and password associated with an account, such as a cloud-based security account (e.g., Microsoft Account).

At 806, the consumer device can access the security account associated with the credentials. In some examples, the consumer device can access the security account over a network, such as network(s) 104. In various examples, the consumer device can input the credentials into one or more input fields associated with the security account to gain access to information stored in the security account. If the credentials are verified, the security account can be accessed.

At 808, the consumer device can obtain one or more recovery passwords from the security account. In some examples, one or more modules on the consumer device can search the information stored in the security account. The modules can identify, based on the searching, where the recovery password is located. In some instances, multiple recovery passwords can be identified and obtained.

At 810, a consumer device can store and/or install the recovery password or passwords to the consumer device. In some examples, the recovery password can be installed to a partition of the consumer device that is not encrypted. For instance, the recovery password can be installed to a partition which comprises the recovery environment where the consumer device is operating. The recovery password can be installed to a boot partition, such as an EFI System Partition.

At 812, the consumer device can reboot. For example, the consumer device can restart and attempt to boot in a normal boot process, as opposed to recovery mode. In some examples, the boot process can identify that the recovery password is installed in the correct locations and is a valid recovery password. In various examples, the recovery password can be used to unlock one or more encryption keys usable to unlock the encrypted information stored in the primary partition. This can allow the consumer device to become unlocked and to boot into the normal system boot process and load the operating system.

Figure 9:
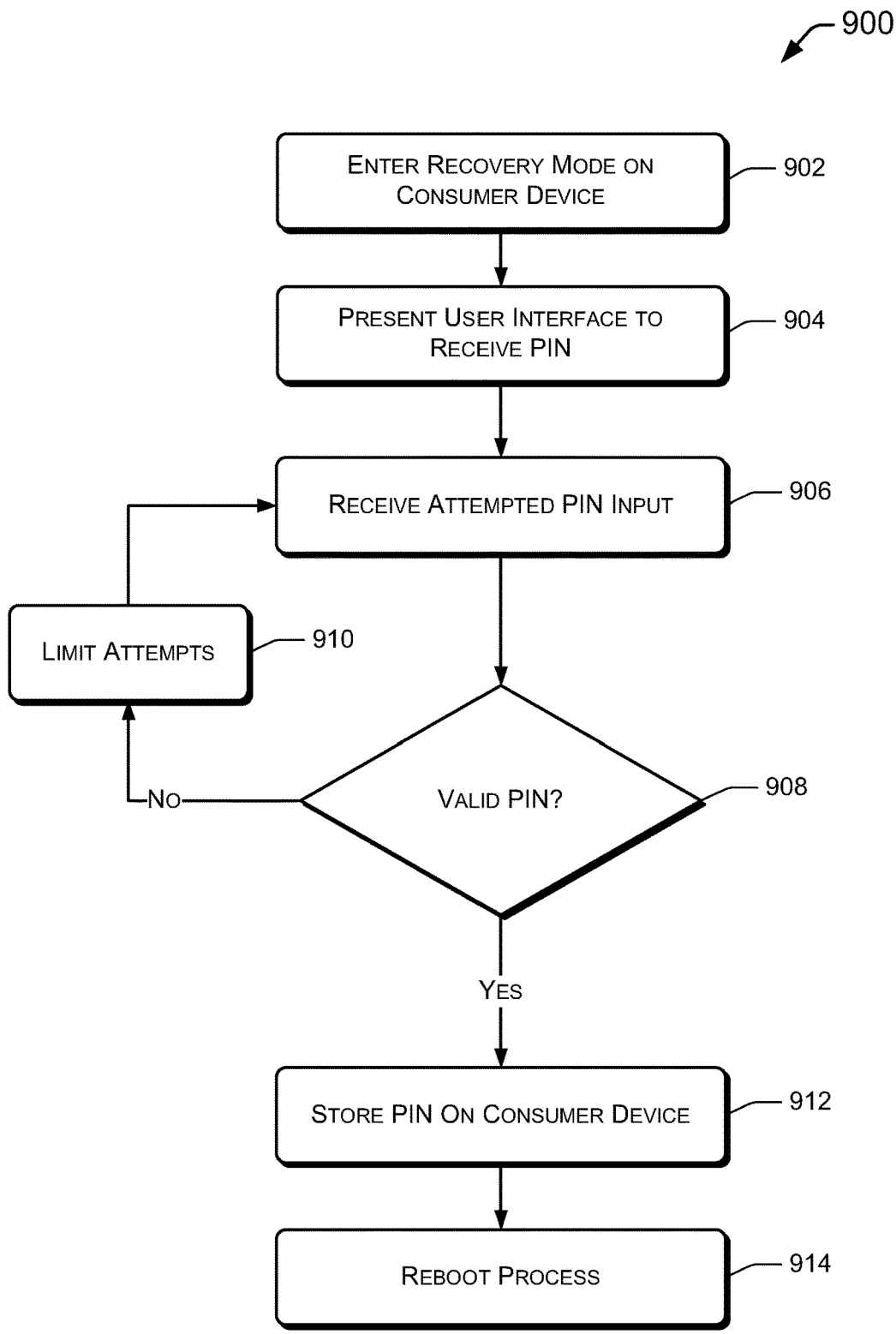
FIG. 9 is a flow diagram showing another example method to recover encrypted data stored on a computing device.

FIG. 9 is a flow diagram showing an example method 900 to recover encrypted data stored on a consumer device. At 902, a consumer device 102 may become locked by entering a recovery mode, or recovery environment. In some examples, a TPM may force the consumer device into recovery mode due to problems or changes detected with data stored in memory. In various examples, the recovery mode operates in an environment separate from a normal operating environment. For example, in the recovery mode, the consumer device may not be able to access information stored in a primary partition where the operating system is stored because the primary partition is encrypted.

At 904, a consumer device can cause a user interface to be presented on a display associated with the consumer device. The user interface can prompt a user of the consumer device to enter a PIN using one or more input fields of the user interface.

At 906, a consumer device can receive a PIN. In some examples, the PIN can be received via the user interface being displayed on the display of the consumer device, or a display associated with the consumer device. The PIN can be same as a PIN used to access the consumer device in a normal boot sequence. In some instances, the PIN can comprise a portion of a larger recovery password. For instance, a recovery password for the consumer device can be 48 characters, and the PIN can comprise one or more characters of the 48 character recovery password. For example, the PIN can comprise the last or first characters of the 48 character recovery password (e.g., 4, 5, or 6 characters).

At 908, a consumer device can determine whether the PIN is a valid PIN. If the inputted PIN is valid, the method can continue to 910. In some examples, determining whether the PIN is a valid PIN can include comparing the PIN to a list of valid PINs. If the PIN is valid at 910, the method may limit attempts at inputting a PIN.

At 912, a consumer device may install or store a valid PIN in one or more locations on the consumer device. For example, the PIN can be installed to a boot partition, or EFI System Partition, of the consumer device.

At 914, the consumer device can reboot. For example, the consumer device can restart and attempt to boot into a normal boot process, as opposed to booting into recovery mode. In some examples, the boot process can identify that the PIN is installed in the correct locations and that the PIN is a valid PIN. In various examples, the PIN can be used to unlock one or more encryption keys that are usable to unlock the encrypted information stored in a primary partition, such as an operating system. This can allow the consumer device to become unlocked and boot into the normal system boot process by loading the unlocked operating system.

Figure 10:
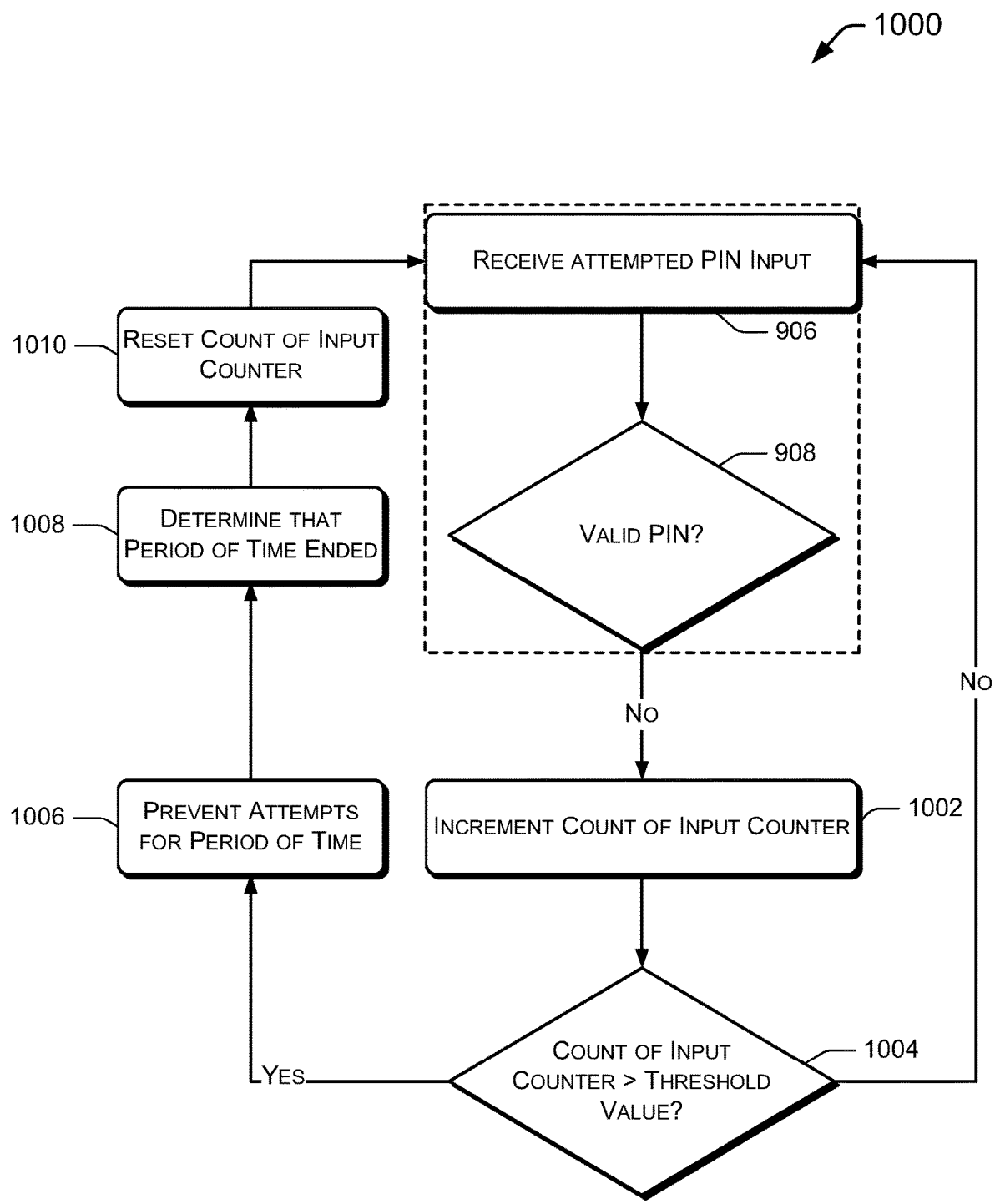
FIG. 10 is a flow diagram showing an example method for limiting incorrect attempts at inputting a PIN into a consumer device.

FIG. 10 is a flow diagram showing an example method 1000 for limiting further attempts at inputting a PIN into a consumer device, which in some instances corresponds to 910. As described in FIG. 9, method 910 is implemented when an invalid PIN is entered at event 908.

If an attempted PIN input is determined to be an invalid PIN at 908, at 1002 a count of an input counter is incremented. For example, the input counter can start at 0, and if an attempted PIN input is not valid, the count can be incremented by 1.

At 1004, it is determined whether a count of the input counter is greater than a threshold value. For example, the threshold value can be 5 attempts. If the count of the input counter is lower than or equal to the threshold value, the method can revert to 906 where another attempted PIN input can be received. Alternatively, if the count of the input counter exceeds the threshold value, the method can proceed to 1006. One skilled in the art would appreciate that 5 is an arbitrary number, and any number greater or smaller than 5 can be used as the threshold value. In some instances, the threshold value can be user configurable.

At 1006, attempts are prevented from being input for a period of time. The period of time can comprise any time period (e.g., 5 minutes, 30 minutes, etc.). By lengthening the time period, programs or entities that continuously attempt PIN inputs to guess at a valid PIN can be deterred, or have their attempts at guessing slowed.

At 1008, it can be determined that the period of time has ended.

At 1010, the count of the input counter can be reset to allow for more attempted PIN inputs at 906. In some examples, the amount of attempts can reset and further allow the entire amount of incorrect attempts before preventing further attempts. In some examples, the amount of PIN attempts may not reset, and attempts can be prevented for a period of time after one incorrect PIN entry. In some examples, the threshold value can be changed if the count of the input counter has exceeded the threshold value one or more times. For example, the threshold value can be lowered after an entity has failed to input a valid PIN more than the threshold value.

Example Clauses

A: A computing device, comprising: one or more processors; computer-readable media configured to be communicatively coupled to the one or more processors and storing instructions that, based on execution by the one or more processors, configure the computing device, while the computing device is in a recovery mode, to: receive credentials associated with accessing a security account; access the security account using the credentials; obtain a recovery password from the security account; and store the recovery password in a data partition or an unencrypted location of the computing device.

B: A computing device as paragraph A recites, wherein the credentials comprise a user ID and password.

C: A computing device as paragraph A and/or B recites, wherein the security account comprises a cloud-based security account.

D: A computing device as any of paragraphs A-C recites, further configured to: detect one or more networks usable to access the cloud-based security account; present a user interface, via a display of the computing device, to prompt entry of access information associated with logging into the one or more networks; connect, via the one or more networks, to the cloud-based security account; submit the credentials into one or more input fields of the cloud-based security account; and access the cloud-based security account.

E: A computing device as any of paragraphs A-D recites, wherein obtaining the recovery password from the security account comprises identifying the recovery password from data of the security account.

F: A computing device as any of paragraphs A-E recites, further configured to reboot the computing device into another operating mode other than the recovery mode.

G: A computing device as any of paragraphs A-F recites, wherein the recovery password is usable to unlock one or more unlock keys associated with an encrypted partition of the computing device.

H: A computing device, comprising: one or more processors; computer-readable media comprising a recovery module stored thereon, the computer-readable media configured to be communicatively coupled to the one or more processors and, based on execution by the one or more processors while the computing device is in a recovery mode, further configured to: present, via a display associated with the computing device, a user interface to receive input; receive input; and determine whether the input corresponds to a valid personal identification number (PIN); and a trusted platform module (TPM) or other protector containing logic configured to implement an anti-hammering capability.

I: A computing device as paragraph H recites, wherein the logic configured to implement the anti-hammering capability is further configured to: determine that the input does not correspond to the valid PIN; based at least on the input not corresponding to the valid PIN, increment a count of an input counter; in response to incrementing the count of the input counter, determine that the count has not exceeded a threshold value; and present the user interface to prompt for another input.

J: A computing device as paragraph H and/or I recites wherein the logic configured to implement the anti-hammering capability is further configured to:
determine that the input does not correspond to the valid PIN; based at least on the input not corresponding to the valid PIN, increment a count of an input counter; in response to incrementing the count of the input counter, determine that the count has exceeded a threshold value; and prevent the recovery module from receiving additional inputs for a period of time.

K: A computing device as any of paragraphs H-J recites, wherein the logic configured to implement the anti-hammering capability is further configured to: determine that the period of time has ended; present the user interface to prompt for another input; and reset the count of the input counter.

L: A computing device as any of paragraphs H-K recites, the operation comprising storing the input to a data partition or an unencrypted location of the computing device to unlock a key for decrypting information stored on the computing device.

M: A computing device as any of paragraphs H-L recites, the computer-readable media further comprising a boot-up module stored thereon, the computer-readable media configured to be communicatively coupled to the one or more processors and, based on execution by the one or more processors while the computing device is in a normal boot-up mode, further configured to: access the unlock key; and decrypt at least a portion of the information stored on the computing device using the unlock key.

N: A computing device as any of paragraphs H-M recites, wherein the TPM or other protector contains logic configured based on execution by the one or more processors while the computing device is in the recovery mode.

O: A method comprising: receiving, from a consumer device, information associated with the consumer device; sending, to an authentication service, the information to verify the consumer device; receiving, from the authentication service, a signed unlock token associated with unlocking the consumer device; receiving a personal identification number (PIN); and storing the signed unlock token and the pin in a data partition or an unencrypted location of the consumer device while the consumer device is in a recovery mode.

P: A method as paragraph 0 recites, the information associated with the consumer device including at least one of device identification information or original equipment manufacturer (OEM) information.

Q: A method as paragraph 0 and/or P recites, the signed unlock token including device identification information, OEM information, and/or an unlock type.

R: A method as any of paragraphs O-Q, further comprising: accessing the signed unlock token; and unlocking the consumer device based at least in part on the unlock type.

S: A method as any of paragraphs O-R recites, further comprising causing the consumer device to reboot.

T: A method as any of paragraphs O-S recites, further comprising: accessing the unencrypted location of the consumer device; determining that the PIN corresponds to a valid PIN; and unlocking a key stored in a Trusted Platform Module (TPM) or other protector, the key configured for use in decrypting information stored on the consumer device.

U: A method as any of paragraphs O-T recites, further comprising: presenting a user interface on a display associated with the consumer device to prompt for input of the pin; and receiving the pin.

V: A method as any of paragraphs O-U recites, the data partition or an unencrypted location comprising an Extensible Firmware Interface (EFI) System Partition.

W: A computer-readable medium including computer executable instructions to configure a computer to perform a method as any of paragraphs O-V recite.

X: A system comprising: one or more processors; and a computer-readable medium configured to be coupled to the one or more processors, the computer-readable medium including processor-executable instructions to configure a computer to perform a method as any of paragraphs O-V recite.

Y: A system comprising: means for receiving information associated with a consumer device; means for sending, to an authentication service, the information to verify the consumer device; means for receiving, from the authentication service, a signed unlock token associated with unlocking the consumer device; means for receiving a personal identification number (PIN); and means for storing the signed unlock token and the pin in a data partition or an unencrypted location of the consumer device while the consumer device is in a recovery mode.

Z: A system as paragraph Y recites, the information associated with the consumer device including at least one of device identification information or original equipment manufacturer (OEM) information.

AA: A system as paragraph Y and/or Z recites, the signed unlock token including device identification information, OEM information, and/or an unlock type.

AB: A system as any of paragraphs Y-AA recites, further comprising: means for accessing the signed unlock token; and means for unlocking the consumer device based at least in part on the unlock type.

AC: A system as any of paragraphs Y-AB recites, further comprising means for causing the consumer device to reboot.

AD: A system as any of paragraphs Y-AC recites, further comprising: means for accessing the unencrypted location of the consumer device; means for determining that the PIN corresponds to a valid PIN; and means for unlocking a key stored in a Trusted Platform Module (TPM) or other protector, the key configured for use in decrypting information stored on the consumer device.

AE: A system as any of paragraphs Y-AD recites, further comprising: means for presenting a user interface on a display associated with the consumer device to prompt for input of the pin; and means for receiving the pin.

AF: A system as any of paragraphs Y-AE recites, the data partition or an unencrypted location comprising an Extensible Firmware Interface (EFI) System Partition.

AG: A method comprising: configuring a computing device, while the computing device is in a recovery mode, to: receive credentials associated with accessing a security account; access the security account using the credentials; obtain a recovery password from the security account; and store the recovery password in a data partition or an unencrypted location of the computing device.

AH A method as paragraph AG recites, wherein the credentials comprise a user ID and password.

AI: A method as paragraph AG and/or AH recites, wherein the security account comprises a cloud-based security account.

AJ: A method as any of paragraphs AG-AI recites, further comprising: detecting one or more networks usable to access the cloud-based security account; presenting a user interface, via a display of the computing device, to prompt entry of access information associated with logging into the one or more networks; connecting, via the one or more networks, to the cloud-based security account; submitting the credentials into one or more input fields of the cloud-based security account; and accessing the cloud-based security account.

AK: A method as any of paragraphs AG-AJ recites, wherein obtaining the recovery password from the security account comprises identifying the recovery password from data of the security account.

AL: A method as any of paragraphs AG-AK recites, further comprising rebooting the computing device into another operating mode other than the recovery mode.

AM: A method as any of paragraphs AG-AL recites, wherein the recovery password is usable to unlock one or more unlock keys associated with an encrypted partition of the computing device.

AN: A computer-readable medium including computer executable instructions to configure a computer to perform a method as any of paragraphs AG-AM recite.

AO: A system comprising: one or more processors; and a computer-readable medium configured to be coupled to the one or more processors, the computer-readable medium including processor-executable instructions to configure a computer to perform a method as any of paragraphs AJ-AM recite.

AP: A system comprising: means for configuring a computing device, while the computing device is in a recovery mode, to: receive credentials associated with accessing a security account; access the security account using the credentials; obtain a recovery password from the security account; and store the recovery password in a data partition or an unencrypted location of the computing device.

AQ: A system as paragraph AP recites, wherein the credentials comprise a user ID and password.

AR: A system as paragraph AP and/or AQ recites, wherein the security account comprises a cloud-based security account.

AS: A system as any of paragraphs AP-AR recites, further comprising: means for detecting one or more networks usable to access the cloud-based security account; means for presenting a user interface, via a display of the computing device, to prompt entry of access information associated with logging into the one or more networks; means for connecting, via the one or more networks, to the cloud-based security account; submitting the credentials into one or more input fields of the cloud-based security account; and means for accessing the cloud-based security account.

AT: A system as any of paragraphs AP-AS recites, wherein the means for obtaining the recovery password from the security account comprises means for identifying the recovery password from data of the security account.

AU: A system as any of paragraphs AP-AT recites, further comprising means for rebooting the computing device into another operating mode other than the recovery mode.

AV: A system as any of paragraphs AP-AU recites, wherein the recovery password is usable to unlock one or more unlock keys associated with an encrypted partition of the computing device.

AW: A method comprising: executing a recovery module by one or more processors while a computing device is in a recovery mode; presenting, via a display associated with the computing device, a user interface to receive input; receiving input; and determining whether the input corresponds to a valid personal identification number (PIN); executing a trusted platform module (TPM) or other protector by the one or more processors to implement an anti-hammering capability.

AX: A method as paragraph AW recites, wherein implementing the anti-hammering capability comprises: determining, using the TPM or other protector, that the input does not correspond to the valid PIN; based at least in the input not corresponding to the valid PIN, incrementing a count of an input counter; in response to incrementing the count of the input counter, determining that the count has not exceeded a threshold value; and presenting the user interface to prompt for another input.

AY: A method as paragraph AW and/or AX recites, wherein implementing the anti-hammering capability comprises: determining, using the TPM or other protector, that the input does not correspond to the valid PIN; based at least on the input not corresponding to the valid PIN, incrementing a count of an input counter; in response to incrementing the count of the input counter, determining that the count has exceeded a threshold value; and preventing the recovery module from receiving additional inputs for a period of time.

AZ: A method as any of paragraphs AW-AY recites, wherein implementing the anti-hammering capability further comprises: determining, using the TPM or other protector, that the period of time has ended; presenting the user interface to prompt for another input; and resetting the count of the input counter.

BA: A method as any of paragraphs AW-AZ recites, further comprising storing the input to a data partition or an unencrypted location of the computing device to unlock a key for decrypting information stored on the computing device.

BB: A method as any of paragraphs AW-BA recites, further comprising: executing a boot-up module by one or more processors while the computing device is in a normal boot-up mode; accessing an unlock key; and decrypting at least a portion of the information stored on the computing device using the unlock key.

BC: A computer-readable medium including computer executable instructions to configure a computer to perform a method as any of paragraphs AW-BB recite.

BD: A system comprising: one or more processors; and a computer-readable medium configured to be coupled to the one or more processors, the computer-readable medium including processor-executable instructions to configure a computer to perform a method as any of paragraphs AW-BB recite.

BE: A system comprising: means for executing a recovery module by one or more processors while a computing device is in a recovery mode; means for presenting, via a display associated with the computing device, a user interface to receive input; receiving input; and means for determining whether the input corresponds to a valid personal identification number (PIN); means for executing a trusted platform module (TPM) or other protector to implement an anti-hammering capability.

BF: A system as paragraph BE recites, wherein the means for implementing the anti-hammering capability comprises: means for determining that the input does not correspond to the valid PIN; based at least on the input not corresponding to the valid PIN, means for incrementing a count of an input counter; means for determining that the count has not exceeded a threshold value, e.g., in response to incrementing the count of the input counter; and means for presenting the user interface to prompt for another input.

BG: A system as paragraph BE and/or BF recites, wherein the means for implementing the anti-hammering capability comprises: means for determining that the input does not correspond to the valid PIN; based at least on the input not corresponding to the valid PIN, means for incrementing a count of an input counter; means for determining that the count has exceeded a threshold value, e.g., in response to incrementing the count of the input counter; and means for preventing the recovery module from receiving additional inputs for a period of time.

BH: A system as any of paragraphs BE-BG recites, wherein the means for implementing the anti-hammier capability further comprises: means for determining that the period of time has ended; means for presenting the user interface to prompt for another input; and means for resetting the count of the input counter.

BI: A system as any of paragraphs BE-BH recites, further comprising means for storing the input to a data partition or an unencrypted location of the computing device to unlock a key for decrypting information stored on the computing device.

BJ: A system as any of paragraphs BE-BI recites, further comprising: means for executing a boot-up module while the computing device is in a normal boot-up mode; means for accessing an unlock key; and means for decrypting at least a portion of the information stored on the computing device using the unlock key.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 110, 134, 146, 214, 216, 218, and/or 222, such as one or more internal or external CPUs or GPUs, and/or one or more pieces of hardware logic such as FPGAs, DSPs, or other types of accelerators.

All of the methods and processes described above can be embodied in, and fully automated via, software code modules executed by one or more general purpose computers or processors. The code modules can be stored in any type of computer-readable storage medium or other computer storage device. Some or all of the methods can alternatively be embodied in specialized computer hardware.

Conditional language such as, among others, "can," "could," "might" or "can," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. can be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions can be deleted, or executed out of order from that shown or discussed, including substantially synchronously or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims.

What is claimed is:

1. A system, comprising:
a memory storing instructions for implementing an unlock module and a trusted platform module (TPM) comprising logic configured to implement an anti-hammering capability;
one or more processors communicatively coupled with the memory and configured to execute the instructions, while a computing device is in a recovery mode, to:
present, via a display associated with the system, a user interface configured to prompt for an input;
receive an input;
determine whether the input corresponds to a valid personal identification number (PIN); and
when the computing device is booted in a recovery mode separate from a normal boot-up sequence:
access, in an unencrypted volume of the system outside of the TPM, based on determining that the input corresponds to the valid PIN, at least one of a signed unlock token or an unlock key;
decrypt, using the signed unlock token or the unlock key, an encrypted volume of the system that is encrypted using a full volume encryption; and
recover, based on decrypting the encrypted volume, data from the encrypted volume; and
when the computing device is in the normal boot-up sequence:
access, in the unencrypted volume of the system, based on determining that the input corresponds to the valid PIN, the unlock key; and
decrypt, using the unlock key, at least a portion of information stored in the encrypted volume of the system; and
boot in the normal boot-up sequence and loading an operating system based on at least the portion of information.

2. The system of claim 1, wherein:
the logic configured to implement the anti-hammering capability is further configured to:
determine that the input does not correspond to the valid PIN;
increment, based at least on the input not corresponding to the valid PIN, a count of an input counter; and
determine, in response to incrementing the count of the input counter, that the count has exceeded a threshold value; and
the one or more processors are further configured to prevent the system from receiving additional inputs for a period of time in response to determining that the count has exceeded the threshold value.

3. The system of claim 2, wherein the logic configured to implement the anti-hammering capability is further configured to:
determine that the period of time has ended;
present the user interface to prompt for another input; and
reset the count of the input counter.

4. The system of claim 1, wherein the one or more processors are further configured to store the input to the unencrypted volume of the system to unlock the unlock key for decrypting encrypted information stored in the system.

5. The system of claim 1, wherein the one or more processors are further configured to execute the instructions to verify, prior to accessing the unlock key, that the unlock key is installed in a correct location of the unencrypted volume of the system.

6. The system of claim 1, wherein the unencrypted volume of the system includes an Extensive Firmware Interface (EFI) System Partition.

7. A method by a system, comprising:
presenting, via a display associated an unlocking module of the system, a user interface configured to prompt for an input;
receiving an input monitored by a trusted platform module (TPM) comprising logic configured to implement an anti-hammering capability;
determining whether the input corresponds to a valid personal identification number (PIN); and
when the system is booted in a recovery mode separate from a normal boot-up sequence:
accessing, in an unencrypted volume of the system outside of the TPM, based on determining that the input corresponds to the valid PIN, at least one of a signed unlock token or an unlock key;
decrypting, using the signed unlock token or the unlock key, an encrypted volume of the system that is encrypted using a full volume encryption; and
recovering, based on decrypting the encrypted volume, data from the encrypted volume; and
when the system is in the normal boot-up sequence:
accessing, in the unencrypted volume of the system, based on determining that the input corresponds to the valid PIN, the unlock key; and
decrypting, using the unlock key, at least a portion of information stored in the encrypted volume of the system; and
booting in the normal boot-up sequence and loading an operating system based on at least the portion of information.

8. The method of claim 7, further comprising:
incrementing, based at least on the input not corresponding to the valid PIN, a count of an input counter; and
determining, in response to incrementing the count of the input counter, that the count has exceeded a threshold value; and
preventing the system from receiving additional inputs for a period of time in response to determining that the count has exceeded the threshold value.

9. The method of claim 8, further comprising:
determining that the period of time has ended;
presenting the user interface to prompt for another input; and
resetting the count of the input counter.

10. The method of claim 7, further comprising storing the input to the unencrypted volume of the system to unlock the unlock key for decrypting encrypted information stored in the system.

11. The method of claim 7, further comprising verifying, prior to accessing the unlock key, that the unlock key is installed in a correct location of the unencrypted volume of the system.

12. The method of claim 7, wherein the unencrypted volume of the system includes an Extensive Firmware Interface (EFI) System Partition.

13. A non-transitory computer readable medium having instructions stored therein that, when executed by one or more processors of a system, cause the one or more processors to:
  present, via a display associated an unlocking module of the system, a user interface configured to prompt for an input;
  receive an input monitored by a trusted platform module (TPM) comprising logic configured to implement an anti-hammering capability;
  determine whether the input corresponds to a valid personal identification number (PIN); and
  when the system is booted in a recovery mode separate from a normal boot-up sequence:
    access, in an unencrypted volume of the system outside of the TPM, based on determining that the input corresponds to the valid PIN, at least one of a signed unlock token or an unlock key;
    decrypt, using the signed unlock token or the unlock key, an encrypted volume of the system that is encrypted using a full volume encryption; and
    recover, based on decrypting the encrypted volume, data from the encrypted volume; and
  when the system is in the normal boot-up sequence:
    access, in the unencrypted volume of the system, based on determining that the input corresponds to the valid PIN, the unlock key; and
    decrypt, using the unlock key, at least a portion of information stored in the encrypted volume of the system; and
    boot in the normal boot-up sequence and loading an operating system based on at least the portion of information.

14. The non-transitory computer readable medium of claim 13, further comprising instructions that, when executed by the one or more processors, cause the one or more processors to:
  increment, based at least on the input not corresponding to the valid PIN, a count of an input counter; and
  determine, in response to incrementing the count of the input counter, that the count has exceeded a threshold value; and
  prevent the system from receiving additional inputs for a period of time in response to determining that the count has exceeded the threshold value.

15. The non-transitory computer readable medium of claim 14, further comprising instructions that, when executed by the one or more processors, cause the one or more processors to:
  determine that the period of time has ended;
  present the user interface to prompt for another input; and
  reset the count of the input counter.

16. The non-transitory computer readable medium of claim 13, further comprising instructions that, when executed by the one or more processors, cause the one or more processors to store the input to the unencrypted volume of the system to unlock the unlock key for decrypting encrypted information stored in the system.

17. The non-transitory computer readable medium of claim 13, further comprising instructions that, when executed by the one or more processors, cause the one or more processors to verify, prior to accessing the unlock key, that the unlock key is installed in a correct location of the unencrypted volume of the system.

* * * * *